US011738936B2

(12) United States Patent
Krüger

(10) Patent No.: US 11,738,936 B2
(45) Date of Patent: Aug. 29, 2023

(54) PORTION CAPSULE HAVING AN IDENTIFIER

(71) Applicant: K-FEE SYSTEM GMBH, Bergisch Gladbach (DE)

(72) Inventor: Marc Krüger, Bergisch Gladbach (DE)

(73) Assignee: K-FEE SYSTEM GMBH, Bergisch Gladbach (DE)

( * ) Notice: Subject to any disclaimer, the term of this patent is extended or adjusted under 35 U.S.C. 154(b) by 0 days.

(21) Appl. No.: 17/963,392

(22) Filed: Oct. 11, 2022

(65) Prior Publication Data
US 2023/0033642 A1 Feb. 2, 2023

Related U.S. Application Data

(60) Continuation of application No. 17/844,372, filed on Jun. 20, 2022, now Pat. No. 11,548,722, which is a
(Continued)

(30) Foreign Application Priority Data

| Jul. 22, 2010 | (DE) | 10 2010 031 988.0 |
| Sep. 2, 2010 | (DE) | 10 2010 044 251.8 |
| Feb. 7, 2011 | (DE) | 10 2011 010 534.4 |

(51) Int. Cl.
*B65D 85/804* (2006.01)
*A47J 31/44* (2006.01)
(Continued)

(52) U.S. Cl.
CPC ...... *B65D 85/8061* (2020.05); *A47J 31/3628* (2013.01); *A47J 31/3638* (2013.01);
(Continued)

(58) Field of Classification Search
CPC ............ B65D 85/8061; B65D 85/8058; B65D 85/8043; B65D 65/466; B65D 2203/06;
(Continued)

(56) References Cited

U.S. PATENT DOCUMENTS

| 726,793 A | 4/1903 | Bezzera |
| 2,778,739 A | 1/1957 | Rodth |

(Continued)

FOREIGN PATENT DOCUMENTS

| CA | 2436389 A1 | 8/2002 |
| CA | 2327021 C | 1/2005 |

(Continued)

OTHER PUBLICATIONS

Rawle, Alan, "Particle Sizing—An Introduction" 2012; Silver Colloids, Edition or volume on Colloidal Silver.
(Continued)

*Primary Examiner* — Jimmy Chou
(74) *Attorney, Agent, or Firm* — The Dobrusin Law Firm, P.C.

(57) ABSTRACT

A method of making a portion capsule that includes steps of: forming a metal material into a base element that includes: i) a wall extending around a central longitudinal axis to define a cavity, and ii) a rim having a top side and an opposing bottom side; filling the cavity with a beverage material; closing the cavity by attaching a foil cover onto the top side of the rim, the cover being dimensioned and configured to be: i) pierced by the mandrel of the beverage making machine in a piercing region, and ii) sealed by the seal of the beverage making machine in a sealing region; and providing an optically detectable identifier onto the metal material so that the optically detectable identifier results on the bottom side of the rim.

20 Claims, 12 Drawing Sheets

Related U.S. Application Data continuation of application No. 17/670,765, filed on Feb. 14, 2022, now Pat. No. 11,465,830, which is a continuation of application No. 17/670,629, filed on Feb. 14, 2022, now Pat. No. 11,465,829, which is a continuation of application No. 17/547,363, filed on Dec. 10, 2021, now Pat. No. 11,542,094, which is a continuation of application No. 15/646,980, filed on Jul. 11, 2017, now Pat. No. 11,554,910, which is a division of application No. 15/211,823, filed on Jul. 15, 2016, now abandoned, which is a division of application No. 13/744,623, filed on Jan. 18, 2013, now abandoned, which is a continuation of application No. PCT/EP2011/003677, filed on Jul. 22, 2011.

(51) Int. Cl.
 A47J 31/40 (2006.01)
 A47J 31/36 (2006.01)
 B65D 65/46 (2006.01)

(52) U.S. Cl.
 CPC ......... *A47J 31/407* (2013.01); *A47J 31/4492* (2013.01); *B65D 85/8043* (2013.01); *B65D 85/8058* (2020.05); *B65D 65/466* (2013.01); *B65D 2203/06* (2013.01); *B65D 2203/10* (2013.01)

(58) Field of Classification Search
 CPC .............. B65D 2203/10; A47J 31/3628; A47J 31/3638; A47J 31/407
 USPC ........................................................ 426/115
 See application file for complete search history.

(56) References Cited

U.S. PATENT DOCUMENTS

| | | | |
|---|---|---|---|
| 3,183,096 A | 5/1965 | Hiscock | |
| 3,387,553 A | 6/1968 | Tavera | |
| 3,437,253 A | 4/1969 | Davis et al. | |
| 3,501,896 A | 3/1970 | Stoeser et al. | |
| 3,521,207 A | 7/1970 | Britton et al. | |
| 3,631,793 A | 1/1972 | Bednartz | |
| 3,640,727 A | 2/1972 | Heusinkveld | |
| 3,744,026 A | 7/1973 | Wolff | |
| 4,136,202 A | 1/1979 | Favre | |
| 4,389,925 A | 6/1983 | Piana | |
| 4,534,985 A | 8/1985 | Gasau | |
| 4,540,595 A | 9/1985 | Acitelli et al. | |
| 4,644,151 A | 5/1987 | Piet | |
| 4,676,482 A | 11/1987 | Marvin et al. | |
| 4,742,645 A | 5/1988 | Johnston | |
| 4,846,052 A | 7/1989 | Farve et al. | |
| 4,859,337 A | 8/1989 | Woltermann | |
| 4,860,645 A | 8/1989 | Van Der Lijn et al. | |
| 4,867,993 A | 9/1989 | Nordskog | |
| 4,976,179 A | 12/1990 | Lacrouts-Cazenave | |
| 5,012,629 A | 5/1991 | Rehman et al. | |
| 5,028,769 A | 7/1991 | Claypool et al. | |
| 5,108,768 A | 4/1992 | So | |
| 5,194,553 A | 3/1993 | Freeburne et al. | |
| 5,242,702 A | 9/1993 | Fond | |
| 5,243,164 A | 9/1993 | Erickson et al. | |
| 5,251,758 A | 10/1993 | Kolacek | |
| 5,261,558 A | 11/1993 | Claydon | |
| 5,285,041 A | 2/1994 | Wright | |
| 5,325,765 A | 7/1994 | Sylvan et al. | |
| 5,402,707 A | 4/1995 | Fond et al. | |
| 5,460,078 A | 10/1995 | Weller | |
| 5,496,573 A | 3/1996 | Tsuji et al. | |
| 5,501,945 A | 3/1996 | Kanakkanatt | |
| 5,535,765 A | 7/1996 | Takashima | |
| 5,601,716 A | 2/1997 | Heinrich et al. | |
| 5,637,850 A | 6/1997 | Honda | |
| 5,656,311 A | 8/1997 | Fond | |
| 5,656,316 A | 8/1997 | Fond et al. | |
| 5,656,318 A | 8/1997 | Fond et al. | |
| 5,677,522 A | 10/1997 | Rice et al. | |
| 5,725,261 A | 3/1998 | Rahn | |
| 5,840,189 A | 11/1998 | Sylvan et al. | |
| 5,888,549 A | 3/1999 | Buchholz et al. | |
| 5,895,672 A | 4/1999 | Cooper | |
| 5,897,899 A | 4/1999 | Fond | |
| 5,917,165 A | 6/1999 | Platt et al. | |
| 5,941,055 A | 8/1999 | Coates | |
| 5,948,455 A | 9/1999 | Schaeffer et al. | |
| 5,980,743 A | 11/1999 | Bairischer | |
| 5,994,677 A | 11/1999 | Akerlind | |
| 6,025,000 A | 2/2000 | Fond et al. | |
| 6,079,315 A | 6/2000 | Beaulieu et al. | |
| 6,142,063 A | 11/2000 | Beaulieu et al. | |
| 6,153,026 A | 11/2000 | Michotte | |
| 6,199,780 B1 | 3/2001 | Görlitz | |
| 6,202,929 B1 | 3/2001 | Verschuur et al. | |
| 6,213,326 B1 | 4/2001 | Denner et al. | |
| 6,299,926 B1 | 10/2001 | Balakrishnan et al. | |
| 6,440,256 B1 | 8/2002 | Gordon et al. | |
| 6,451,332 B1 | 9/2002 | Tanaka et al. | |
| 6,527,181 B1 | 3/2003 | Kleeberg et al. | |
| 6,589,577 B2 | 7/2003 | Lazaris et al. | |
| 6,598,800 B1 | 7/2003 | Schmit et al. | |
| 6,607,762 B2 | 8/2003 | Lazaris et al. | |
| 6,627,244 B2 | 9/2003 | Omura | |
| 6,645,537 B2 | 11/2003 | Sweeney et al. | |
| 6,655,260 B2 | 12/2003 | Lazaris | |
| 6,817,538 B2 | 11/2004 | Afzali-Ardakani et al. | |
| 6,861,086 B2 | 3/2005 | Buckingham et al. | |
| 6,931,984 B2* | 8/2005 | Lassota ................. | A47J 31/52 99/283 |
| 6,948,420 B2 | 9/2005 | Kirschner et al. | |
| 6,994,879 B2 | 2/2006 | Cirigliano et al. | |
| 7,408,094 B2 | 8/2008 | Little et al. | |
| 7,412,921 B2 | 8/2008 | Hu et al. | |
| 7,444,925 B2 | 11/2008 | Mahlich | |
| 7,464,518 B2 | 12/2008 | Ansinn | |
| 7,543,527 B2 | 6/2009 | Schmed | |
| 7,552,672 B2 | 6/2009 | Schmed | |
| 7,595,870 B2 | 9/2009 | Ringlien | |
| 7,673,558 B2 | 3/2010 | Panesar et al. | |
| 7,685,930 B2 | 3/2010 | Mandralis et al. | |
| 7,815,953 B2 | 10/2010 | Mastropasqua et al. | |
| 7,856,920 B2* | 12/2010 | Schmed ............. | A47J 31/3695 99/305 |
| 7,935,646 B2 | 5/2011 | Viazmensky et al. | |
| 7,946,217 B2 | 5/2011 | Favre et al. | |
| 7,981,451 B2 | 7/2011 | Ozanne | |
| 8,039,029 B2 | 10/2011 | Ozanne | |
| 8,039,034 B2 | 10/2011 | Ozanne | |
| 8,087,347 B2 | 1/2012 | Halliday et al. | |
| 8,088,423 B2 | 1/2012 | Ohresser et al. | |
| 8,101,928 B2 | 1/2012 | Hill et al. | |
| 8,109,200 B2 | 2/2012 | Hansen | |
| 8,114,461 B2 | 2/2012 | Perlman et al. | |
| 8,163,318 B2 | 4/2012 | Ozanne et al. | |
| 8,168,908 B2 | 5/2012 | Heimann | |
| 8,257,766 B2 | 9/2012 | Yoakim et al. | |
| 8,276,639 B2 | 10/2012 | Binacchi | |
| 8,307,754 B2 | 11/2012 | Ternite et al. | |
| 8,361,527 B2 | 1/2013 | Winkler et al. | |
| 8,474,368 B2 | 7/2013 | Kilber et al. | |
| 8,491,948 B2 | 7/2013 | Ozanne et al. | |
| 8,491,976 B2 | 7/2013 | Sato et al. | |
| 8,505,440 B2 | 8/2013 | Kirschner et al. | |
| 8,512,886 B2 | 8/2013 | Ozanne | |
| 8,695,484 B2 | 4/2014 | Mori | |
| 8,734,881 B2 | 5/2014 | Yoakim et al. | |
| 8,747,775 B2 | 6/2014 | Sandvick | |
| 8,794,125 B1 | 8/2014 | Rivera | |
| 8,868,232 B2 | 10/2014 | Freudelsperger | |
| 8,906,436 B2 | 12/2014 | Nowak | |
| 8,916,220 B1 | 12/2014 | Mahlich et al. | |
| 8,956,672 B2 | 2/2015 | Yoakim et al. | |
| 9,049,958 B2 | 6/2015 | Fischer | |

(56) References Cited

U.S. PATENT DOCUMENTS

| | | | |
|---|---|---|---|
| D734,665 S | 7/2015 | Cahen et al. | |
| 9,072,402 B2 | 7/2015 | Ryser | |
| 9,079,705 B2 | 7/2015 | Digiuni | |
| 9,150,347 B2 | 10/2015 | Scheiber | |
| 9,204,751 B2 | 12/2015 | Peterson | |
| 9,216,854 B2 | 12/2015 | Schreiber | |
| 9,227,837 B2 | 1/2016 | Reinmuth | |
| 9,271,602 B2 | 3/2016 | Beaulieu et al. | |
| 9,290,317 B2 | 3/2016 | Quinn et al. | |
| 9,295,278 B2 | 3/2016 | Nowak | |
| 9,320,385 B2 | 4/2016 | Spiegel et al. | |
| 9,357,791 B2 | 6/2016 | Fountain et al. | |
| 9,359,126 B2 | 6/2016 | Wong et al. | |
| 9,359,128 B2 | 6/2016 | Mahlich | |
| 9,392,902 B2 | 7/2016 | Parentes et al. | |
| 9,394,101 B2 | 7/2016 | Empl | |
| 9,409,703 B2 | 8/2016 | Krüger et al. | |
| 9,409,704 B2 | 8/2016 | Digiuni et al. | |
| 9,415,931 B2 | 8/2016 | Gerbaulet et al. | |
| 9,428,328 B2 | 8/2016 | Trombetta et al. | |
| 9,428,329 B2 | 8/2016 | Trombetta et al. | |
| 9,434,525 B2 | 9/2016 | Fabozzi et al. | |
| 9,486,108 B1 | 11/2016 | Douglas et al. | |
| 9,676,538 B2 | 6/2017 | Evers et al. | |
| 9,708,086 B2 | 7/2017 | Bianchi | |
| 9,756,974 B2 | 9/2017 | Rivera | |
| 9,770,129 B2 | 9/2017 | Remo et al. | |
| 9,808,112 B2 | 11/2017 | Favero et al. | |
| 9,969,564 B2 | 5/2018 | Krüger | |
| 11,542,094 B2 * | 1/2023 | Krüger | B65D 85/8058 |
| 2001/0038204 A1 | 11/2001 | Nojima et al. | |
| 2001/0047724 A1 | 12/2001 | Lazaris | |
| 2001/0048957 A1 | 12/2001 | Lazaris et al. | |
| 2002/0020659 A1 | 2/2002 | Sweeney | |
| 2002/0048621 A1 * | 4/2002 | Boyd | B65D 85/8046 426/77 |
| 2002/0078831 A1 | 6/2002 | Cai | |
| 2002/0085164 A1 | 7/2002 | Stanford-Clark | |
| 2002/0088807 A1 | 7/2002 | Perkovic et al. | |
| 2002/0110626 A1 | 8/2002 | Buckingham et al. | |
| 2002/0144603 A1 | 10/2002 | Taylor | |
| 2002/0148356 A1 | 10/2002 | Lazaris et al. | |
| 2003/0005826 A1 | 1/2003 | Sargent et al. | |
| 2003/0033938 A1 | 2/2003 | Halliday et al. | |
| 2003/0039731 A1 | 2/2003 | Dalton et al. | |
| 2003/0121979 A1 | 7/2003 | Haens et al. | |
| 2003/0172813 A1 | 9/2003 | Schifferle | |
| 2003/0222089 A1 | 12/2003 | Hale | |
| 2004/0005384 A1 | 1/2004 | Cai | |
| 2004/0045443 A1 | 3/2004 | Lazaris et al. | |
| 2004/0089158 A1 | 5/2004 | Mahlich | |
| 2004/0089602 A1 | 5/2004 | Heinrich et al. | |
| 2004/0112222 A1 | 6/2004 | Fischer | |
| 2004/0115310 A1 | 6/2004 | Yoakim et al. | |
| 2004/0118295 A1 | 6/2004 | Angeles | |
| 2004/0142070 A1 | 7/2004 | Haen | |
| 2004/0155113 A1 | 8/2004 | Urano et al. | |
| 2004/0182250 A1 | 9/2004 | Halliday et al. | |
| 2004/0188459 A1 | 9/2004 | Halliday et al. | |
| 2005/0016383 A1 | 1/2005 | Kirschner et al. | |
| 2005/0045566 A1 | 3/2005 | Larkin et al. | |
| 2005/0051478 A1 | 3/2005 | Karanikos et al. | |
| 2005/0061478 A1 | 3/2005 | Huang | |
| 2005/0150391 A1 * | 7/2005 | Schifferle | A47J 31/3695 99/295 |
| 2005/0160919 A1 | 7/2005 | Balkau | |
| 2005/0183581 A1 | 8/2005 | Kirschner et al. | |
| 2005/0266122 A1 | 12/2005 | Franceschi | |
| 2006/0010744 A1 | 1/2006 | Schumacher | |
| 2006/0032427 A1 | 2/2006 | Ishii et al. | |
| 2006/0084344 A1 | 4/2006 | Bonneh | |
| 2006/0107841 A1 | 5/2006 | Schifferle | |
| 2006/0194004 A1 | 8/2006 | Niemoller et al. | |
| 2006/0228447 A1 | 10/2006 | Ganesan et al. | |
| 2006/0230941 A1 | 10/2006 | Ryser et al. | |
| 2006/0233921 A1 | 10/2006 | Mock et al. | |
| 2006/0236871 A1 | 10/2006 | Ternite et al. | |
| 2007/0144355 A1 | 6/2007 | Denisart et al. | |
| 2007/0148290 A1 | 6/2007 | Ternite et al. | |
| 2007/0157821 A1 | 7/2007 | Panesar et al. | |
| 2007/0181005 A1 | 8/2007 | Kirschner et al. | |
| 2007/0181412 A1 | 8/2007 | Raunig | |
| 2007/0203587 A1 | 8/2007 | Erlandsson et al. | |
| 2007/0257118 A1 | 11/2007 | Riley et al. | |
| 2008/0024536 A1 | 1/2008 | Hirano et al. | |
| 2008/0026121 A1 | 1/2008 | Mastropasqua et al. | |
| 2008/0028946 A1 | 2/2008 | Kirschner et al. | |
| 2008/0038441 A1 | 2/2008 | Kirschner | |
| 2008/0085356 A1 | 4/2008 | Colliver et al. | |
| 2008/0105131 A1 | 5/2008 | Castellani | |
| 2008/0116105 A1 | 5/2008 | Statham | |
| 2008/0148948 A1 | 6/2008 | Evers et al. | |
| 2008/0187638 A1 * | 8/2008 | Hansen | B65D 85/8058 426/433 |
| 2008/0245236 A1 * | 10/2008 | Ternite | A47J 31/3623 99/295 |
| 2008/0299262 A1 | 12/2008 | Reati | |
| 2008/0302251 A1 | 12/2008 | Rijskamp et al. | |
| 2009/0004343 A1 | 1/2009 | Xiong et al. | |
| 2009/0007793 A1 | 1/2009 | Glucksman et al. | |
| 2009/0007796 A1 | 1/2009 | Ricotti | |
| 2009/0092711 A1 | 4/2009 | Ninh et al. | |
| 2009/0126577 A1 | 5/2009 | Ternite | |
| 2009/0136626 A1 | 5/2009 | Mueller | |
| 2009/0205747 A1 | 8/2009 | Lillard, Jr. | |
| 2009/0211458 A1 | 8/2009 | Denisart et al. | |
| 2009/0211713 A1 | 8/2009 | Binacchi | |
| 2009/0223375 A1 | 9/2009 | Verbeek | |
| 2009/0249961 A1 | 10/2009 | Cheng | |
| 2009/0289121 A1 | 11/2009 | Maeda et al. | |
| 2009/0291379 A1 | 11/2009 | Oota et al. | |
| 2009/0324788 A1 | 12/2009 | Roy et al. | |
| 2009/0324791 A1 | 12/2009 | Ohresser et al. | |
| 2010/0000667 A1 | 1/2010 | Funnell | |
| 2010/0028495 A1 | 2/2010 | Novak et al. | |
| 2010/0050880 A1 | 3/2010 | Suter et al. | |
| 2010/0051532 A1 | 3/2010 | Wawrla et al. | |
| 2010/0054532 A1 | 3/2010 | Mitte et al. | |
| 2010/0072272 A1 | 3/2010 | Angros | |
| 2010/0078480 A1 | 4/2010 | Aker | |
| 2010/0108541 A1 | 5/2010 | Roberto | |
| 2010/0129512 A1 | 5/2010 | Accursi | |
| 2010/0132564 A1 * | 6/2010 | Ozanne | A47J 31/4492 99/275 |
| 2010/0147418 A1 | 6/2010 | Piana | |
| 2010/0147872 A1 | 6/2010 | Saxton et al. | |
| 2010/0172951 A1 | 7/2010 | Wasielewski | |
| 2010/0181378 A1 | 7/2010 | Hayakawa et al. | |
| 2010/0196545 A1 | 8/2010 | Buffet et al. | |
| 2010/0239717 A1 | 9/2010 | Yoakim et al. | |
| 2010/0239733 A1 | 9/2010 | Yoakim et al. | |
| 2010/0239734 A1 | 9/2010 | Yoakim et al. | |
| 2010/0260915 A1 | 10/2010 | Young | |
| 2010/0263329 A1 | 10/2010 | Nash | |
| 2010/0264640 A1 | 10/2010 | Lane et al. | |
| 2010/0288131 A1 | 11/2010 | Kilber et al. | |
| 2010/0288133 A1 | 11/2010 | Litzka et al. | |
| 2010/0303964 A1 | 12/2010 | Beaulieu et al. | |
| 2010/0308061 A1 | 12/2010 | Loulourgas | |
| 2011/0005399 A1 | 1/2011 | Epars et al. | |
| 2011/0008913 A1 | 1/2011 | Wadhwa et al. | |
| 2011/0020500 A1 | 1/2011 | Eichler et al. | |
| 2011/0033580 A1 | 2/2011 | Biesheuvel et al. | |
| 2011/0041702 A1 | 2/2011 | Yoakim | |
| 2011/0052761 A1 | 3/2011 | Yoakim et al. | |
| 2011/0064852 A1 | 3/2011 | Mann | |
| 2011/0076361 A1 | 3/2011 | Peterson et al. | |
| 2011/0089135 A1 | 4/2011 | Simon et al. | |
| 2011/0097450 A1 | 4/2011 | Krüger | |
| 2011/0142996 A1 | 6/2011 | Krüger | |
| 2011/0189350 A1 | 8/2011 | Van Belleghem et al. | |
| 2011/0189362 A1 | 8/2011 | Denisart et al. | |
| 2011/0212225 A1 | 9/2011 | Mariller | |

(56) References Cited

U.S. PATENT DOCUMENTS

| | | | |
|---|---|---|---|
| 2011/0226343 A1* | 9/2011 | Novak | B01F 23/2362 99/323.2 |
| 2011/0250333 A1 | 10/2011 | Ozanne | |
| 2011/0250812 A1 | 10/2011 | Pourdeyhimi et al. | |
| 2011/0262601 A1* | 10/2011 | Manser | A23L 33/40 426/431 |
| 2011/0265659 A1 | 11/2011 | Giua | |
| 2011/0303095 A1 | 12/2011 | Fu et al. | |
| 2011/0308397 A1 | 12/2011 | Sinot et al. | |
| 2012/0006685 A1 | 1/2012 | Van Engelen | |
| 2012/0058226 A1 | 3/2012 | Winkler et al. | |
| 2012/0060697 A1 | 3/2012 | Ozanne | |
| 2012/0070542 A1 | 3/2012 | Camera et al. | |
| 2012/0070543 A1 | 3/2012 | Mahlich | |
| 2012/0070551 A1 | 3/2012 | Mahlich | |
| 2012/0097041 A1 | 4/2012 | Bucher et al. | |
| 2012/0097602 A1 | 4/2012 | Tedford | |
| 2012/0100264 A1 | 4/2012 | Bucher et al. | |
| 2012/0121765 A1 | 5/2012 | Kamerbeek et al. | |
| 2012/0123106 A1 | 5/2012 | Joos | |
| 2012/0126834 A1 | 5/2012 | Kleinhans | |
| 2012/0183657 A1 | 7/2012 | Marina et al. | |
| 2012/0195155 A1 | 8/2012 | Gennai et al. | |
| 2012/0201933 A1 | 8/2012 | Dran et al. | |
| 2012/0207893 A1 | 8/2012 | Krüger | |
| 2012/0207895 A1 | 8/2012 | Rivera | |
| 2012/0251668 A1 | 10/2012 | Wong et al. | |
| 2012/0251672 A1 | 10/2012 | Kamerbeek et al. | |
| 2012/0258210 A1 | 10/2012 | Wong et al. | |
| 2012/0269933 A1 | 10/2012 | Rapparini | |
| 2012/0295234 A1 | 11/2012 | Rognon et al. | |
| 2012/0308688 A1 | 12/2012 | Peterson et al. | |
| 2013/0014648 A1 | 1/2013 | Rognon et al. | |
| 2013/0055903 A1 | 3/2013 | Deuber | |
| 2013/0059039 A1 | 3/2013 | Trombetta et al. | |
| 2013/0064929 A1 | 3/2013 | Jarisch et al. | |
| 2013/0064937 A1* | 3/2013 | Jarisch | G06K 19/0614 426/112 |
| 2013/0084363 A1 | 4/2013 | Krueger et al. | |
| 2013/0084376 A1 | 4/2013 | Fischer et al. | |
| 2013/0099597 A1 | 4/2013 | Perentes | |
| 2013/0101716 A1 | 4/2013 | Beaulieu et al. | |
| 2013/0122153 A1 | 5/2013 | Ferrier et al. | |
| 2013/0125762 A1 | 5/2013 | Dogan et al. | |
| 2013/0129872 A1 | 5/2013 | Krueger et al. | |
| 2013/0129876 A1 | 5/2013 | Ye et al. | |
| 2013/0136828 A1 | 5/2013 | Anghileri | |
| 2013/0149424 A1 | 6/2013 | Fischer | |
| 2013/0156897 A1 | 6/2013 | Goldstein | |
| 2013/0206011 A1 | 8/2013 | Ozanne et al. | |
| 2013/0209610 A1 | 8/2013 | Carder et al. | |
| 2013/0209618 A1 | 8/2013 | Trombetta et al. | |
| 2013/0209619 A1 | 8/2013 | Mahlich | |
| 2013/0209620 A1 | 8/2013 | Ozanne et al. | |
| 2013/0209622 A1 | 8/2013 | Fountain et al. | |
| 2013/0216663 A1 | 8/2013 | Dogan et al. | |
| 2013/0230627 A1 | 9/2013 | Hansen et al. | |
| 2013/0236609 A1 | 9/2013 | Magniet et al. | |
| 2013/0243910 A1 | 9/2013 | Krueger et al. | |
| 2013/0312619 A1 | 11/2013 | Spiegel et al. | |
| 2013/0327223 A1 | 12/2013 | Bartoli et al. | |
| 2014/0001563 A1 | 1/2014 | Krueger et al. | |
| 2014/0004231 A1 | 1/2014 | Norton et al. | |
| 2014/0017359 A1 | 1/2014 | Krueger et al. | |
| 2014/0046126 A1 | 2/2014 | Gilligan et al. | |
| 2014/0127364 A1 | 5/2014 | Fu et al. | |
| 2014/0141128 A1 | 5/2014 | Trombetta et al. | |
| 2014/0141129 A1 | 5/2014 | Greene | |
| 2014/0161936 A1 | 6/2014 | Trombetta et al. | |
| 2014/0178538 A1 | 6/2014 | Husband et al. | |
| 2014/0196608 A1 | 7/2014 | Amrein et al. | |
| 2014/0220191 A1 | 8/2014 | Kelly et al. | |
| 2014/0224130 A1 | 8/2014 | Castellani et al. | |
| 2014/0230370 A1 | 8/2014 | Bianchi | |
| 2014/0242239 A1 | 8/2014 | Boggavarapu | |
| 2014/0263033 A1 | 9/2014 | Fu et al. | |
| 2014/0272018 A1 | 9/2014 | Koller et al. | |
| 2014/0287104 A1 | 9/2014 | Austin et al. | |
| 2014/0287105 A1 | 9/2014 | Husband et al. | |
| 2014/0302204 A1 | 10/2014 | Evers et al. | |
| 2014/0346022 A1 | 11/2014 | Keller et al. | |
| 2014/0348984 A1 | 11/2014 | Zeller et al. | |
| 2014/0370181 A1 | 12/2014 | Young et al. | |
| 2015/0010680 A9 | 1/2015 | Mahlich | |
| 2015/0017293 A1 | 1/2015 | Carr et al. | |
| 2015/0020481 A1 | 1/2015 | Hodler | |
| 2015/0029702 A1 | 1/2015 | Foley | |
| 2015/0047509 A1 | 2/2015 | Trombetta et al. | |
| 2015/0056331 A1 | 2/2015 | Rivera | |
| 2015/0056340 A1 | 2/2015 | Trombetta et al. | |
| 2015/0056351 A1 | 2/2015 | Deuber | |
| 2015/0079241 A1 | 3/2015 | Mahlich | |
| 2015/0119220 A1 | 4/2015 | Rea et al. | |
| 2015/0128525 A1 | 5/2015 | Bartoli et al. | |
| 2015/0132441 A1 | 5/2015 | Accursi | |
| 2015/0157164 A1 | 6/2015 | Digiuni | |
| 2015/0158665 A1 | 6/2015 | Krueger et al. | |
| 2015/0158666 A1 | 6/2015 | Krüger et al. | |
| 2015/0166204 A1 | 6/2015 | Rea et al. | |
| 2015/0173558 A1 | 6/2015 | Cross et al. | |
| 2015/0175347 A1 | 6/2015 | Empl | |
| 2015/0201790 A1 | 7/2015 | Smith et al. | |
| 2015/0225169 A1 | 8/2015 | Jarisch | |
| 2015/0239652 A1 | 8/2015 | Trombetta et al. | |
| 2015/0246741 A1 | 9/2015 | Hansen et al. | |
| 2015/0274411 A1 | 10/2015 | Krueger | |
| 2015/0297021 A1 | 10/2015 | Bugnano et al. | |
| 2015/0297023 A1 | 10/2015 | Hansen et al. | |
| 2015/0314954 A1 | 11/2015 | Empl | |
| 2015/0329282 A1 | 11/2015 | Bartoli et al. | |
| 2015/0353275 A1 | 12/2015 | Accursi | |
| 2015/0368033 A1 | 12/2015 | Krug et al. | |
| 2015/0375926 A1 | 12/2015 | Fischer | |
| 2016/0001968 A1 | 1/2016 | Krüger et al. | |
| 2016/0037961 A1 | 2/2016 | Digiuni | |
| 2016/0045060 A1 | 2/2016 | Flick | |
| 2016/0058234 A1 | 3/2016 | Eppler et al. | |
| 2016/0066591 A1 | 3/2016 | Halliday et al. | |
| 2016/0075506 A1 | 3/2016 | Chapman et al. | |
| 2016/0130076 A1 | 5/2016 | Jarisch | |
| 2016/0174757 A1 | 6/2016 | Rivera | |
| 2016/0194146 A1 | 7/2016 | Schelch et al. | |
| 2016/0207696 A9 | 7/2016 | Trombetta et al. | |
| 2016/0242594 A1 | 8/2016 | Empl et al. | |
| 2016/0251150 A1 | 9/2016 | Macchi et al. | |
| 2016/0325921 A1 | 11/2016 | Empl | |
| 2016/0332759 A1 | 11/2016 | Trombetta et al. | |
| 2016/0340110 A1 | 11/2016 | Trombetta et al. | |
| 2017/0020329 A1 | 1/2017 | Douglas et al. | |
| 2017/0027374 A1 | 2/2017 | Smith et al. | |
| 2017/0071395 A1 | 3/2017 | Krüger et al. | |
| 2017/0295988 A1 | 10/2017 | Chung | |
| 2018/0325309 A1 | 11/2018 | Short et al. | |
| 2019/0055084 A1 | 2/2019 | D'Urso | |
| 2019/0359418 A1 | 11/2019 | Kruger | |
| 2021/0086986 A1 | 5/2021 | Krüger | |
| 2021/0269232 A1 | 9/2021 | Krüger | |

FOREIGN PATENT DOCUMENTS

| | | |
|---|---|---|
| CA | 2400033 C | 2/2005 |
| CA | 2399290 C | 1/2006 |
| CA | 2399283 C | 5/2007 |
| CA | 2661921 A1 | 3/2008 |
| CA | 2763746 A1 | 3/2010 |
| CA | 2784752 C | 6/2011 |
| CA | 2662071 C | 7/2011 |
| CA | 2538256 C | 8/2011 |
| CA | 2810237 A1 | 3/2012 |
| CA | 2531544 C | 5/2012 |
| CA | 2662069 C | 1/2013 |
| CA | 2785843 A1 | 2/2013 |
| CA | 2788283 A1 | 3/2013 |
| CA | 2866119 A1 | 9/2013 |

(56) References Cited

FOREIGN PATENT DOCUMENTS

| | | |
|---|---|---|
| CA | 2872667 A1 | 11/2013 |
| CA | 2874025 A1 | 12/2013 |
| CA | 2877090 A1 | 1/2014 |
| CA | 2886299 A1 | 4/2014 |
| CA | 2888658 C | 6/2014 |
| CA | 2898173 A1 | 8/2014 |
| CA | 2902231 A1 | 8/2014 |
| CA | 2901582 A1 | 11/2014 |
| CA | 2832794 C | 3/2016 |
| CA | 2833096 C | 5/2016 |
| CN | 101646613 A | 2/2010 |
| CN | 102741136 A | 10/2012 |
| CN | 104334473 A | 2/2015 |
| DE | 1207866 B | 12/1965 |
| DE | 1221960 B | 7/1966 |
| DE | 3432339 A1 | 3/1986 |
| DE | 19910226 A1 | 9/2000 |
| DE | 69615001 T2 | 3/2002 |
| DE | 202006003115 U1 | 5/2006 |
| DE | 60115221 T2 | 7/2006 |
| DE | 102006004329 A1 | 8/2007 |
| DE | 202009014945 U1 | 9/2010 |
| DE | 202010007919 U1 | 11/2010 |
| DE | 102010027485 A1 | 1/2012 |
| DE | 102010034206 A1 | 2/2012 |
| DE | 102011010534 A1 | 8/2012 |
| DE | 102011115833 A1 | 4/2013 |
| DE | 102012110446 A1 | 1/2014 |
| DE | 102014018470 A1 | 6/2016 |
| EP | 0224297 A1 | 6/1987 |
| EP | 0242556 A1 | 10/1987 |
| EP | 0244339 A1 | 11/1987 |
| EP | 0272432 A1 | 6/1988 |
| EP | 0272922 A2 | 6/1988 |
| EP | 0334572 A1 | 9/1989 |
| EP | 0455337 A1 | 11/1991 |
| EP | 0468078 A1 | 1/1992 |
| EP | 0468079 A1 | 1/1992 |
| EP | 0512468 A1 | 11/1992 |
| EP | 0569230 A1 | 11/1993 |
| EP | 569230 A1 | 11/1993 |
| EP | 0656224 A1 | 6/1995 |
| EP | 0638486 B1 | 10/1996 |
| EP | 0844195 A1 | 5/1998 |
| EP | 0859467 A1 | 8/1998 |
| EP | 0923865 A2 | 6/1999 |
| EP | 1129623 A1 | 9/2001 |
| EP | 1221418 A1 | 7/2002 |
| EP | 1273528 A1 | 1/2003 |
| EP | 1344722 A1 | 9/2003 |
| EP | 1344724 A1 | 9/2003 |
| EP | 1363501 A2 | 11/2003 |
| EP | 1471012 A2 | 10/2004 |
| EP | 1555219 A1 | 7/2005 |
| EP | 1559351 A2 | 8/2005 |
| EP | 1586534 A1 | 10/2005 |
| EP | 1710173 A1 | 10/2006 |
| EP | 1722398 A1 | 11/2006 |
| EP | 1772398 A1 | 4/2007 |
| EP | 1792850 B1 | 6/2007 |
| EP | 1796516 A2 | 6/2007 |
| EP | 1849718 A1 | 10/2007 |
| EP | 1859713 A1 | 11/2007 |
| EP | 1882432 A1 | 1/2008 |
| EP | 1882432 B1 | 1/2008 |
| EP | 1892199 A1 | 2/2008 |
| EP | 1974638 A1 | 10/2008 |
| EP | 2145759 A1 | 1/2010 |
| EP | 2158829 A1 | 3/2010 |
| EP | 1882431 B1 | 4/2010 |
| EP | 2218653 A1 | 8/2010 |
| EP | 2230195 A1 | 9/2010 |
| EP | 2239211 A1 | 10/2010 |
| EP | 2284102 A1 | 2/2011 |
| EP | 2287090 A1 | 2/2011 |
| EP | 2364930 A2 | 9/2011 |
| EP | 2384133 B1 | 11/2011 |
| EP | 2384199 A1 | 11/2011 |
| EP | 2412645 A1 | 2/2012 |
| EP | 2444339 A1 | 4/2012 |
| EP | 2012994 B1 | 7/2012 |
| EP | 2484505 A2 | 8/2012 |
| EP | 2537778 A1 | 12/2012 |
| EP | 2559636 A1 | 2/2013 |
| EP | 2595902 A1 | 5/2013 |
| EP | 2780866 B1 | 9/2014 |
| EP | 2809006 A1 | 12/2014 |
| EP | 2957525 A1 | 12/2015 |
| EP | 3023361 A1 | 5/2016 |
| EP | 2569230 B1 | 7/2016 |
| FR | 2556323 A1 | 6/1985 |
| FR | 2912124 A1 | 8/2008 |
| FR | 2963332 A1 | 2/2012 |
| GB | 1402799 A | 8/1975 |
| GB | 2469874 A | 11/2010 |
| GB | 2482032 A | 1/2012 |
| JP | S62-130649 A | 6/1987 |
| JP | S62-168512 A | 7/1987 |
| JP | S6415233 A | 1/1989 |
| JP | H01-233688 A | 9/1989 |
| JP | 02289207 A | 11/1990 |
| JP | H0394377 A | 4/1991 |
| JP | H04176311 A | 6/1992 |
| JP | H06510682 A | 12/1994 |
| JP | 2001-017094 A | 1/2001 |
| JP | 2001-082699 A | 3/2001 |
| JP | 2001-250161 A | 9/2001 |
| JP | 2002-274000 A | 9/2002 |
| JP | 2002-347852 A | 12/2002 |
| JP | 2003-522567 A | 7/2003 |
| JP | 2003-235733 A | 8/2003 |
| JP | 2003-265320 A | 9/2003 |
| JP | 2004-097015 A | 4/2004 |
| JP | 2004-533305 A | 11/2004 |
| JP | 2005-199070 A | 7/2005 |
| JP | 2006-510682 A | 3/2006 |
| JP | 2007-522856 A | 8/2007 |
| JP | 2010-500199 A | 1/2010 |
| JP | 2010-507418 A | 3/2010 |
| JP | 2010-516364 A | 5/2010 |
| JP | 2010-528635 A | 8/2010 |
| JP | 2013-538609 A | 10/2013 |
| JP | 2015-085086 A | 5/2015 |
| KR | 1020050107747 A | 11/2005 |
| KR | 200435370 Y1 | 1/2007 |
| NZ | 596919 A | 11/2013 |
| WO | 94/01344 A1 | 1/1994 |
| WO | 98/51396 A1 | 11/1998 |
| WO | 99/03753 A1 | 1/1999 |
| WO | 99/58035 A1 | 11/1999 |
| WO | 2001/060712 A1 | 8/2001 |
| WO | 01/99047 A | 12/2001 |
| WO | 02/28241 A | 4/2002 |
| WO | 02/078498 A1 | 10/2002 |
| WO | 2004/065258 A2 | 8/2004 |
| WO | 2004/071899 A1 | 8/2004 |
| WO | 2004/082390 A1 | 9/2004 |
| WO | 2005/044067 A1 | 5/2005 |
| WO | 2005/047111 A1 | 5/2005 |
| WO | 2005/079638 A1 | 9/2005 |
| WO | 2006/108578 A1 | 10/2006 |
| WO | 2006/121520 A2 | 11/2006 |
| WO | 2007/042414 A1 | 4/2007 |
| WO | 2007/042486 A2 | 4/2007 |
| WO | 2007/114685 A1 | 10/2007 |
| WO | 2007/122144 A1 | 11/2007 |
| WO | 2007/122208 A1 | 11/2007 |
| WO | 2008/011913 A1 | 1/2008 |
| WO | 2008/090122 A2 | 7/2008 |
| WO | 2008/107645 A2 | 9/2008 |
| WO | 2008/121489 A1 | 10/2008 |
| WO | 2008/126045 A1 | 10/2008 |
| WO | 2008/132571 A1 | 11/2008 |
| WO | 2009/084061 A1 | 7/2009 |

(56) References Cited

FOREIGN PATENT DOCUMENTS

| | | |
|---|---|---|
| WO | 2009/112291 A1 | 9/2009 |
| WO | 2009/114119 A1 | 9/2009 |
| WO | 2009/115475 A1 | 9/2009 |
| WO | 2009/130311 A1 | 10/2009 |
| WO | 2009/153161 A1 | 12/2009 |
| WO | 2010/007633 A1 | 1/2010 |
| WO | 2010/026052 A1 | 3/2010 |
| WO | 2010/026053 A1 | 3/2010 |
| WO | 2010/013146 A3 | 4/2010 |
| WO | 2010/034663 A1 | 4/2010 |
| WO | 2010/041179 A2 | 4/2010 |
| WO | 2010/076048 A1 | 7/2010 |
| WO | 2010/076263 A1 | 7/2010 |
| WO | 2010/076761 A1 | 7/2010 |
| WO | 2010/085824 A1 | 8/2010 |
| WO | 2010/099806 A1 | 9/2010 |
| WO | 2010/118545 A2 | 10/2010 |
| WO | 2010/125326 A1 | 11/2010 |
| WO | 2010/125329 A1 | 11/2010 |
| WO | 2010/138563 A1 | 11/2010 |
| WO | 2010/137952 A1 | 12/2010 |
| WO | 2010/137960 A1 | 12/2010 |
| WO | 2011/000723 A2 | 1/2011 |
| WO | 2011/012501 A1 | 2/2011 |
| WO | 2011/047836 A1 | 4/2011 |
| WO | 2011/141532 A1 | 11/2011 |
| WO | 2011/147491 A1 | 12/2011 |
| WO | 2011/147553 A1 | 12/2011 |
| WO | 2011/147591 A1 | 12/2011 |
| WO | 2012/007257 A1 | 1/2012 |
| WO | 2012/009668 A1 | 1/2012 |
| WO | 2012/019902 A1 | 2/2012 |
| WO | 2012/038063 A1 | 3/2012 |
| WO | 2012/057257 A1 | 5/2012 |
| WO | 2012/080928 A1 | 6/2012 |
| WO | 2012/100977 A1 | 8/2012 |
| WO | 2012/104760 A1 | 8/2012 |
| WO | 2012/135204 A1 | 10/2012 |
| WO | 2012/175985 A1 | 12/2012 |
| WO | 2013/008012 A2 | 1/2013 |
| WO | 2013/032330 A1 | 3/2013 |
| WO | 2013/043048 A1 | 3/2013 |
| WO | 2013/136209 A1 | 9/2013 |
| WO | 2013/171663 A1 | 11/2013 |
| WO | 2013/189923 A1 | 12/2013 |
| WO | 2014/001563 A1 | 1/2014 |
| WO | 2014/001564 A1 | 1/2014 |
| WO | 2014/004231 A1 | 1/2014 |
| WO | 2014/004564 A1 | 1/2014 |
| WO | 2014/006048 A2 | 1/2014 |
| WO | 2014/090567 A1 | 6/2014 |
| WO | 2014/102702 A1 | 7/2014 |
| WO | 2014/127863 A1 | 8/2014 |
| WO | 2014/191044 A1 | 12/2014 |
| WO | 2012/000878 A2 | 1/2015 |
| WO | 2015/028425 A2 | 3/2015 |
| WO | 2015/062703 A1 | 5/2015 |
| WO | 2015/075584 A1 | 5/2015 |
| WO | 2015/107484 A1 | 7/2015 |
| WO | 2016/077916 A1 | 5/2016 |

OTHER PUBLICATIONS

Decision on Appeal before the Patent Trial and Appeal Board for Appeal No. 2017-007984 dated May 10, 2019.
Notice of Opposition regarding EP3023362 filed Jul. 30, 2018.
Search Report for CN201180035944 dated Sep. 25, 2014.
First Office Action for Application No. CN201180035944 dated Oct. 10, 2014.
Second Office Action for Application No. CN201180035944 dated Apr. 21, 2015.
Third Office Action for Application No. CN201180035944 dated Nov. 12, 2015.
Notification to Grant Patent for Application No. CN201180035944 dated May 25, 2016.
Search Report for CN201610644043 dated May 11, 2018.
First Office Action for CN201610644043 dated May 28, 2018.
Search Report and Written Opinion for PCT/EP2011/003677 dated Jul. 22, 2011.
Search Report and Written Opinion for Application No. EP 15174333.3 dated Nov. 3, 2015. (EP2952453).
Office Action for Application No. EP 15174333.3 dated Aug. 16, 2016. (EP2952453).
Search Report and Written Opinion for Application No. EP 15173071.0 dated Nov. 5, 2015. (EP2957525).
Office Action for Application No. EP 15173071.0 dated Nov. 5, 2015. (EP2957525).
Third party observation for Application No. EP2957525 dated Sep. 30, 2016.
Search Report and Written Opinion for Application No. EP 15197332.8 dated Apr. 12, 2016. (EP3023361).
First Office Action for Application No. EP 15197332.8 dated Jan. 19, 2017. (EP3023361) .
Second Office Action for Application No. EP 15197332.8 dated May 24, 2017. (EP3023361).
Third Office Action for Application No. EP 15197332.8 dated Nov. 2, 2017. (EP3023361).
Search Report and Written Opinion for Application No. EP 15197336.9 dated Apr. 4, 2016 (EP3023362).
Search Report and Written Opinion for Application No. EP 15197338.5 dated Apr. 7, 2016 (EP3023363).
Search Report for Application No. JP 2013-520009 dated Nov. 25, 2014. (JP5946828).
First Office Action for Application No. JP 2013-520009 dated Dec. 10, 2014. (JP5946828).
Second Office Action for Application No. JP 2013-520009 dated Aug. 19, 2015. (JP5946828).
Decision to Grant for Application No. JP 2013-520009 dated Apr. 28, 2016. (JP5946828).
Search Report for Application No. JP 2016-032427 dated Nov. 21, 2016. (JP2016163691).
First Office Action for Application No. JP 2016-032427 dated Nov. 28, 2016. (JP2016163691).
Second Office Action for Application No. JP 2016-032427 dated Jun. 20, 2017. (JP2016163691).
Search Report for Application No. JP 2017-034769 dated Nov. 15, 2017. (JP2017148511).
Office Action for Application No. JP 2017-034769 dated Jan. 30, 2018. (JP2017148511).
Office Action for Application No. KR 10-2013-7004356 dated Apr. 5, 2018. (KR20137004356).
Office Action for Application No. 10-2017-7019956 dated Apr. 10, 2018. (KR20170087528).
Opposition Request against European Patent No. EP 3 023 3 62 dated Jul. 1, 2019.
Notice of Opposition for Application No. 19165223.9 dated Feb. 24, 2020.
Notice of Opposition for European Patent No. EP3521208 granted Feb. 19, 2020.
Opposition against European Patent No. EP3521208; Application No. 19165223.9 granted Feb. 19, 2020.
Communication of Notice of Opposition dated Jan. 27, 2020 for Application No. 19165219.7.
English Translation of JP2003235733.
Wikipedia definition of "Deep Drawing" http://en.wikipedia.org/wiki/Deep_Drawing.
Wikipedia definition of "Tiefziehen" http://de.wikipedia.org/wiki/Tiefziehen.
Wikipedia definition of "Stamping (metalworking)" https://en.wikipedia.org/wiki/Stamping_(metalworking).
Wikipedia definition of "Barcode".
Regulation (EC) No. 1935/2004 of the European Parliament and of the Council of Oct. 27, 2004 Official of the European Union.
Brief Communication for Opposition Proceedings for Appl. 15197336. 9, dated Mar. 19, 2020.

(56) References Cited

OTHER PUBLICATIONS

Oral Letter regarding the opposition Procedure dated Mar. 16, 2020 for EP 3023362.
Opposition oral letter regarding the opposition procedure dated Mar. 16, 2020, for EP 023362.
Annex to the Communication Opposition Appln No. 15197336.9; 2020.
Brief Communication—Opposition Proceedings for Appl. No. 15197336.9 dated Jan. 8, 2020.
Letter regarding Opposition Procedure for EP Patent No. 3023362 dated Dec. 23, 2019.
Brief Communication for Appl No. 15197336.9 dated Oct. 15, 2019.
"Information technology—Automatic identification and data capture techniques—EAN/UPC bar code symbol specification" Second Edition: Dec. 15, 2009.
Letter accompanying subsequently filed items for EP3023362, KRO-44; Oct. 10, 2019.
Brief Communication—Opposition Proceedings for Appl No. 15197336.9 dated Jul. 23, 2019.
Letter accompanying subsequently filed items for EP3023362 1038-CMS-O; Jul. 17, 2019.
Brief Communication—Opposition proceedings for Appln No. 15197336.9 dated Jul. 12, 2019.
Opposition Procedure for EP Patent No. EP 3023362 dated Jul. 1, 2019.
Miscellaneous requests concerning client data EPO—Jun. 12, 2019.
Letter regarding the Opposition Procedure KRO-44/FWJPL dated Mar. 20, 2019.
Ralf Jesse, "Barcode" Gutachten zur Frage Begriffle, Bitcode/Binacode; Patents EP 3023362; May 19, 2019.
"Information technology—Automatic identification and data capture techniques—Bar code verifier conformance specification—Part 1: Linear symbols" May 20, 2019 10:12.
"Information technology—Automatic identification and data capture techniques—Bar code print quality test Spec Linear Symbols" German Version: EN ISO/IEC 15416:2001: Feb. 1998.
Declaration under 27 C.F.R. for U.S. Appl. No. 13/697,297; Aug. 15, 2016.
Wikipedia "Binarcode" https://de.wikipedia.org/wiki/Binarcode.
Rosenbaum, Jessie, "Bar-Code" Theorie Lexikon Software; 2000.
Potter Mathia, "Barcode" Euinfuhrung und Andwendungen; 1993.
Oliver Rosenbaum "Das Barcode-Lexicon" edition advanced: cbhv; 1997.
Fairley Michael "Codes and Coding Technology" LCGS, FIP3 and FLOM3: A Labels & Labeling Publication 2015.
Claims—Amended Claims with annotations—2.
Claims—May 20, 2019 Amended Claims with Annotations.
Auxiliary request during Opposition procedure—May 20, 2019.
Letter regarding opposition procedure for EP 3023362 dated Mar. 4, 2019.
Definition of Barcode by Merriam-Webster https://www.meriam-webster.com/dictionary/barcode.
Barcode—Wikitionary "Barcode" https://de.wikitionary.org/wiki/Barcode 2018.
Strichcode—Wikipedia "Strichcode" https://de.wikiepdia.org/wiki/strichcode.
Reply of the patent proprietor to the notice of opposition Feb. 11, 2019; Appln No. 151973366.9.
Notice of Opposition against European Patent No. EP 3023362 dated Jul. 30, 2018.
Notice of Opposition to a European patent, Patent No. EP3023362 dated Jul. 24, 2018.
Specification NP-C2.03-02-SP-04-2 Membrane.
Specification NP-C2.03-01-SP-01-4 empty capsule.
Marketing brochure "Nespresso Varietaten mit 5 neuen Grand Crus".
Photo taken in Nespresso store.
Marketing brochure "i6 Grands Crus—geschaffen um Ihre Sinne zu ilberraschen".
RTS online article.
Invoice for various Nespresso capsules, dated May 4, 2009.
Invoice for various Nespresso capsules, dated Aug. 10, 2009.
Invoice for various Nespresso capsules, dated Dec. 2, 2009.
Invoice for various Nespresso capsules, dated May 18, 2009.
Invoice for various Nespresso capsules, dated Oct. 21, 2008.
Invoice for various Nespresso capsules, dated Jun. 24, 2009.
Invoice for various Nespresso capsules, dated May 19, 2008.
Invoice for various Nespresso capsules, dated Sep. 10, 2008.
Invoice for various Nespresso capsules, dated Feb. 17, 2009.
Invoice for various Nespresso capsules, dated Dec. 22, 2008.
User manual for the Tassimo@ brewing machine.
Web article discussing the T-discs@ cartridges.
Regulation No. 817.023.21 of the EDI on consumer goods.
Regulation No. 8 17.022.3 1of the EDI on the additives permitted in foodstuffs.
Regulation of the Swiss Federal Council on Foodstuffs and Consumer Goods.
"European Printing Ink Association" Guideline on Printing Inks.
Leaflet on printing inks for food packages from the division "Printing Inks" of the Association of the German Paint and Printing Ink Industry.
EuPIA Exclusion List for Printing Inks and Related Products.
EuPIA Guideline on Good Manufacturing Practices for the Production of Packaging Inks formulated for use on the non-food contact surfaces of food packaging and articles intended to come into contact with food.
Commission Regulation (EC) No. 2023/2006.
Council Directive 89/109/EEC relating to materials and articles intended to come into contact with foodstuffs.
Policy Statement on Packaging Inks applied to the non-food contact surface of Food Packaging of the public health committee of the council of Europe.
Nestle Guidance Note on Packaging Inks.
Council Directive on the colouring matters authorised for use in foodstuffs intended for human consumption.
Council Directive 89/107/EEC on the approximation of the laws of the Member States concerning food additives authorized for use in foodstuffs intended for human consumption.
European Parliament and Council Directive 94/36/EC on colours for use in foodstuffs.
Excerpt from the textbook "Plastics Packaging—Properties, Processing, Applications and Regulations" by Selke/Culter/Hernandez.
"Lexikon Verpackungstechnik" by Bleisch/Goldhahn/Schricker/Vogt.
Paper titled "Aromaveranderung von vakuumverpacktem Kaffee bei unterschiedlichen Packstoffen" by Lindner-Steinert/Zou.
Paper "Die flexible Verpackung von morgen—Anforderungen an die Veredler" by Agulla/Langowski.
Excerpt from publication "Grundziige der Lebensmitteltechnik" of 2004 by Tscheuschner.
Excerpt from publication "Produkt-bkobilanz vakuumverpackter Rostkaffee" of 1999 by Diers/Langowski/Pannkoke.
$3^{rd}$ Party Observations in EP Patent Application No. 19 165 220.5 (3 533 726), dated Jun. 19, 2020.
Opposition Against EP Patent No. EP 3 023 3 62 dated Jul. 13, 2020.
Letter dated Sep. 30, 2020 from file of U.S. Appl. No. 16/517,054 (by Société Des Produits Nestlé S.A).
Supplemental arguments filed by Societe des Produits Nestle S.A. in the opposition against European Patent No. EP3521209, dated Jan. 7, 2021.
Suggestion for Declaration of Interference dated Sep. 30, 2019.
Petition for Inter Partes Review of U.S. Pat. No. 10,870,531 (IPR2021-01223), dated Jul. 12, 2021.
Petition for Inter Partes Review of U.S. Pat. No. 10,858,176 (IPR2021-01221), dated Jul. 12, 2021.
Petition for Inter Partes Review of U.S. Pat. No. 10,858,177 (IPR2021-01222), dated Jul. 12, 2021.
Declaration of Michael Jobin, Exhibit 1003 from Petition for Inter Partes Review of U.S. Pat. No. 10,858,177 (IPR2021-01222), dated Jul. 12, 2021.
Declaration of Michael Jobin, Exhibit 1003 from Petition for Inter Partes Review of U.S. Pat. No. 10,858,176 (IPR2021-01221), dated Jul. 12, 2021.

(56) References Cited

OTHER PUBLICATIONS

Declaration of Michael Jobin, Exhibit 1003 from Petition for Inter Partes Review of U.S. Pat. No. 10,870,531 (IPR2021-01223), dated Jul. 12, 2021.
Nespresso's Preliminary Invalidity Contentions from US District Court Central District of California Case No. 2:21-cv-3402 GW(ARGx), dated Sep. 22, 2021.
English Translation of JPH1-233688.
Submission Dated Apr. 5, 2019, European Patent No. EP3023362.
Third party Observations EP3533726, dated Aug. 26, 2021.
Opposition against European Patent No. EP3521210; dated Oct. 7, 2020.
Opposition against European Patent No. EP3521210; dated Jan. 8, 2020.
Submission for EP Patent No. 3023362, dated Jan. 7, 2021, In response to the Provisional Opinion.
Submission for European Patent No. EP3023362, dated Mar. 26, 2021.
Submission for European Patent No. EP3023362, dated Mar. 26, 2021, In response to the Provisional Opinion.
Submission for European Patent No. EP3023362, dated Apr. 27, 2021.
Submission for European Patent No. EP3521207, dated Mar. 15, 2021.
Submission for European Patent No. EP3521207, dated Oct. 21, 2020.
Submission for European Patent No. EP3521208, dated Mar. 12, 2021.
Submission for European Patent No. EP3521208, dated Oct. 29, 2020.
Submission for European Patent No. EP3521209, dated Jan. 7, 2021.
Submission for European Patent No. EP3521209, dated Oct. 21, 2020.
Wikipedia definition of "Spritzgieben" https://de.wikipedia.org/wiki/Spritzgie%C3%9Fen.
Definition of "Werkstoff" https://www.dwds.de/wb/Werkstoff.
Definition of "Filter" https://www.dwds.de/wb/Filter.
Convenience First: Espresso Pods and Capsules, Jan. 2009. https://www.coffeereview.com/convenience-first-espresso-pods-and-capsules.
Espresso En Capsule, Mar. 2021. https://www.swissinfo.ch/fre/le-march%C3%A9-du-caf%C3%A9-en-capsules-explose-et-inqui%C3%A8te/6421908.
Wiktionary definition of the expression "à base de" available online at: https://fr.wiktionary.org/wiki/%C3%A0_base_de.
D130, the Robert definition of "base" available online at: https://dictionnaire.lerobert.com/definition/base.
Key Science Physics Matter and Energy Strength https://books.google.ch/books?id=uSPzV9R08nsC&pg=PA36%20&dq=%22corrugated_+plastic%22+packaging&hl=fr&sa=X&ve%20d=2ah%20U%20KEwjvlrqZxaXv%20Ah%20Vkx4sKHYIZAHk4PBDoAT%20AlegQIC%20RAC#v=onepage&q.
Key Science Chemistry, toughness and Brittleness https://books.google.ch/books?id=CK8OgULw4oMC&pg_=PA_1_1&dq=%22_corrugated+plastic%22_+packaging_&h_1=fr&sa=X&_ved=2ahUKEwjlrqZxaXvAhVkx4sKHYIZAHk4PBDoATAHegQ_ICBAC#v=onepage&q=%22corrugated%20plastic%22%20pa_ckaging&f=false.
Reusable Transport Packaging 1973 https://books.google.ch/books?id=fitzOnnXD_wC&q=%22corr%20ugated+plastic%22&dq=%22c%20orrugated+plastic%22&h%201=fr%20&sa=X&%20ved=2ah%20U%20KEwj787n%201vqX%20vAhU1qQKHfiDDOq4PBDoATAAeqQIARAC.
Annex illustrating the handling of a double patenting issue.
Opposition Request against European Patent No. EP 2525692B1; dated Jul. 29, 2015.
Strategic Innovation 1999 https://books.google.ch/books?id=rTKHB-9YUbwC&pg=PA%2018&dq=coffee+capsules&hl=fr&sa=X&ved=%202ahUKEwjFgvDQhaXvAhWYA2MBHdhuDMsQ6AEwBXoEC%20A%20YQAg#v=onepaQe&q=coffee%20capsules&f=false.
Le Marche Du Cafe En Capsules Explose Et Inqutete https://pages.rts.ch/emissions/abe/515911-espresso-encapsale-abe-a-souleve-lecouvercle.html.
Kaffeepads Uno—Kapseln Konnen Zur Kostenfalle Werden https://www.t-online.de/leben/id_41150796/kaffeekaffeegads-_und-Kapseln-koennen-zurkostenfalle-werden.html.
La Dosette De Cafe: L'environnement Boit La Tasse https://www.consoglobe.com/dosette-cafe-environnement-boit-tasse-1957-cg.
Preparatory Studies for Ecodesign https://www.eceee.org/static/media/uploads/site-2/ecodesign/products/lot25-non-tertiary_coffee-machines/final_report-task_1_.pdf.
Energie-Environnement.CH Machine a Café https://www.energie-environnement.ch/appareils-electromenagers/machine-a-cafe.
Is There a Serious Problem With Coffee Capsules? https://www.bbc.com/news/magazine-35605927.
Freshness Indices of Roasted Coffee https://www.researchgate.net/publication/26211090_FreshnessIndices_of_Roasted_Coffee_Monitoring_the_Loss_of_Freshness_for_Single_Serve_Capsules_and_Roasted_Whole_Beans_in_DifferentPackaging.
Comparative Life Cycle Assessment https://uwspace.uwaterloo.ca/bitstream/handle/10012/12860/Li_Jinqxi.pdf?sequence=5&isAllowed=Y.
Schnitt-, Stanz-Uno Ztfhwerkzeuge https://books.google.ch/books?id=-qCnBgAAQBAJ&pg=PA386&dq=tiefziehen+aluminiumblech&hl=en&sa=X&_ved=2ah_U_KEwj_HybqNx6L_v_AH_UDwKQKHSNsAbEQ6AEwAXoECAgQAg#v=onepage&q=tiefziehen%20aluminiumblech&f=false.
Thermo-Mechanical Processing of Metallic Materials https://books.google.ch/books?id=VE2OYVDTBZUC&pg=PA370&dq=%22deep+drawing%22+%22aluminium+sheet%22&hl=fr&sa=X&ved=2ah_U_KEwj3ouSI0qL_v_AhWQyqQKH_RbqD?YQ6AEwBHoECAUQAg#v=onepage&q=%22deep%20drawing%22%20%22aluminium%20sheet%22&f=false.
Packaging: Specifications https://books.google.ch/books?id=N1_TLbP9CiDUC&pg=PA265&Ipg=PA265&dq=aluminum+can+barcode+print++varnish&source=bl&ots=rJuPKZptU3&sig=ACfU3U0KHflM3Wh2Gw0zEblq7DDXt5TQxQ&hl=en&sa=X&ved=2ahUKEwjW0NmK64LvAhVnCWMBHRIYCloQ6AEwEXoECA0QAw#v=onepage&q=aluminum%20can%20barcode%20print%20%20varnish&f=fAlse.
Improving Traceability in Food Processing and Distribution httgs://books.google.ch/books?id=v75QAwAAQBAJ&gg=PA209&dg=barcode+ink+gackaging+food&hl=fr&sa=X&ved=2ahUKEwiQ2JjVvKjvAhUDIMUKHU3gDPYQ6AEwBHoECAYQAg#v=oneQage&g=barcode%20ink%20gackaging%20food&f=false.
Food Packaging https://books.google.ch/books?id=NFRR6GayR74C&pg=PA265&dq=welding+plastic+packaging+food&hl=fr&sa=X&ved=2ahUKEwiwhqffl_KPvAhWM14sKHRXUDls4HhDoATACegQIBBAC#v=onepage&q=welding%20plastic%20packaging%20food&f=false.
Coffee Love https://books.google.ch/books?id=0OxRp3jlQlsC&pg=PA_14&dq=coffee+capsu_les&_hl=fr_&sa=X&_ved=2ah_U_KEwj_F0qvMk6XvAhWTBGMBHYddCp04ChDoATAlegQIAhAC#v=onepage&Q=coffee%20capsules&f=false.
Structural Design Procedure https://books.google.ch/books?id=4L64mKIG_4UC&pg=PA_1&dq=%22corrugated+plasti_c%22&h_l=fr&sa=X&_ved=2ah_U_KEwjlcz6uaXvAhWRzaQKHcQpAF4O6AEwAnoECAMQAg#v=onepage&q=%22corrugated%20plastic%22&f=false.
Package Engineering https://books.google.ch/books?id=DydNAAAA_YAAJ&q=%22corrugated+plastic%22&dq=%22corrugated+plastic%22&hl=fr&sa=X&_ved=2ah_U_KEwiq296WvaXv_Ah_WI_POwKHfcaDrk4KBDoATAGeQOIBBAC.
Exhibit A-1—Nespresso's Preliminary Invalidity Contentions dated Sep. 22, 2021.
Exhibit A-2—Nespresso's Preliminary Invalidity Contentions dated Sep. 22, 2021.
Exhibit A-3—Nespresso's Preliminary Invalidity Contentions dated Sep. 22, 2021.

(56) References Cited

OTHER PUBLICATIONS

Exhibit A-4—Nespresso's Preliminary Invalidity Contentions dated Sep. 22, 2021.
Exhibit A-5—Nespresso's Preliminary Invalidity Contentions dated Sep. 22, 2021.
Exhibit A-6—Nespresso's Preliminary Invalidity Contentions dated Sep. 22, 2021.
Exhibit A-7—Nespresso's Preliminary Invalidity Contentions dated Sep. 22, 2021.
Exhibit A-8—Nespresso's Preliminary Invalidity Contentions dated Sep. 22, 2021.
Exhibit A-9—Nespresso's Preliminary Invalidity Contentions dated Sep. 22, 2021.
Exhibit B-1—Nespresso's Preliminary Invalidity Contentions dated Sep. 22, 2021.
Exhibit B-2—Nespresso's Preliminary Invalidity Contentions dated Sep. 22, 2021.
Exhibit B-3—Nespresso's Preliminary Invalidity Contentions dated Sep. 22, 2021.
Exhibit B-4—Nespresso's Preliminary Invalidity Contentions dated Sep. 22, 2021.
Exhibit B-5—Nespresso's Preliminary Invalidity Contentions dated Sep. 22, 2021.
Exhibit B-6—Nespresso's Preliminary Invalidity Contentions dated Sep. 22, 2021.
Exhibit B-7—Nespresso's Preliminary Invalidity Contentions dated Sep. 22, 2021.
Exhibit B-8—Nespresso's Preliminary Invalidity Contentions dated Sep. 22, 2021.
Exhibit B-9—Nespresso's Preliminary Invalidity Contentions dated Sep. 22, 2021.
Exhibit C-1—Nespresso's Preliminary Invalidity Contentions dated Sep. 22, 2021.
Exhibit C-2—Nespresso's Preliminary Invalidity Contentions dated Sep. 22, 2021.
Exhibit C-3—Nespresso's Preliminary Invalidity Contentions dated Sep. 22, 2021.
Exhibit C-4—Nespresso's Preliminary Invalidity Contentions dated Sep. 22, 2021.
Exhibit C-5—Nespresso's Preliminary Invalidity Contentions dated Sep. 22, 2021.
Exhibit C-6—Nespresso's Preliminary Invalidity Contentions dated Sep. 22, 2021.
Exhibit C-7—Nespresso's Preliminary Invalidity Contentions dated Sep. 22, 2021.
Exhibit C-8—Nespresso's Preliminary Invalidity Contentions dated Sep. 22, 2021.
Exhibit C-9—Nespresso's Preliminary Invalidity Contentions dated Sep. 22, 2021.
Exhibit A—Nespresso's Preliminary Invalidity Contentions dated Sep. 22, 2021.
Exhibit B—Nespresso's Preliminary Invalidity Contentions dated Sep. 22, 2021.
Exhibit C—Nespresso's Preliminary Invalidity Contentions dated Sep. 22, 2021.
Nespreso Vertuo Plus User Manual, accessed on Apr. 22, 2022, from: https://www.nespresso.com/shared_res/manuals/vertuoline/www_VERTUOPLUS_C_NESPRESSO_Z1(EN_FR_ES).pdf, and under Document Properties in Adobe includes a Oct. 6, 2016 Created Date and a Oct. 6, 2016 Modified Date.
Final Order on Claim Construction, dated Mar. 10, 2022, in Case No. 2:21-cv-03402-GW (AGRx) .
Non-Final Office Action in U.S. Appl. No. 17/547,363, dated Apr. 4, 2022.
Non-Final Office Action in U.S. Appl. No. 17/670,629, dated Apr. 15, 2022.
Petitioner's Request for Rehearing of the PTAB's Denial of Inter Partes Review of U.S. Pat. No. 10,858,176, filed on Feb. 17, 2022.
Petitioner's Request for Rehearing of the PTAB's Denial of Inter Partes Review of U.S. Pat. No. 10,858,177, filed on Feb. 17, 2022.
Petitioner's Request for Rehearing of the PTAB's Denial of Inter Partes Review of U.S. Pat. No. 10,870,531, filed on Feb. 17, 2022.
Redacted Memorandum of Points and Authorities in Support of Nespresso USA, INC.'s Motion for Summary Judgement of Noninfringement, dated Apr. 1, 2022, in Case No. 2:21-cv-03402-GW (AGRx).
Redacted Nespresso USA, Inc.'s Separate Statement of Uncontroverted Facts and Conclusions of Law in Support of its Motion for Summary Judgement of Noninfringement, dated Apr. 1, 2022, in Case No. 2:21-cv-03402-GW (AGRx).
Redacted Declaration of Christian Jarisch, dated Mar. 30, 2022, and filed in Case No. 2:21-cv-03402-GW (AGRx) on Apr. 1, 2022.
Opposition Appeal Against EP 3023362, dated Dec. 20, 2021, and appended documents.
Exhibit 1045 (English Translation of DE 10 2011 010 534.4) filed by Nespresso USA in IPR2021-01223.
Exhibit 1046 (English Translation of DE 10 2010 031 988.0) filed by Nespresso USA in IPR2021-01223.
Exhibit 1047 (English Translation of DE 10 2010 044 251.8) filed by Nespresso USA in IPR2021-01223.
Third Party Observations against EP 19 165 220.5 (3 533 726), filed by Société des Produits Nestle S.A., Aug. 26, 2021.
Opposition against EP 3 521 209, filed by Société des Produits Nestle S.A., Jan. 22, 2020.
Nespresso's Preliminary Invalidity Contentions dated Jul. 6, 2022, against U.S. Pat. No. 11,254,491, in Case No. 2:22-cv-00525-GW (AGRx).
Appendix A—Obviousness Chart for U.S. Pat. No. 11,254,491 referred to in Nespresso's Preliminary Invalidity Contentions dated Jul. 6, 2022, against U.S. Pat. No. 11,254,491, in Case No. 2:22-cv-00525-GW (AGRx).
Exhibit A-1 Invalidity of U.S. Pat. No. 11,254,491 in view of Denisart, referred to in Nespresso's Preliminary Invalidity Contentions dated Jul. 6, 2022, against U.S. Pat. No. 11,254,491, in Case No. 2:22-cv-00525-GW (AGRx).
Exhibit A-2 Invalidity of U.S. Pat. No. 11,254,491 in view of Giua, referred to in Nespresso's Preliminary Invalidity Contentions dated Jul. 6, 2022, against U.S. Pat. No. 11,254,491, in Case No. 2:22-cv-00525-GW (AGRx).
Exhibit A-3 Invalidity of U.S. Pat. No. 11,254,491 in view of Jarisch, referred to in Nespresso's Preliminary Invalidity Contentions dated Jul. 6, 2022, against U.S. Pat. No. 11,254,491, in Case No. 2:22-cv-00525-GW (AGRx).
Exhibit A-4 Invalidity of U.S. Pat. No. 11,254,491 in view of Jarisch 929, referred to in Nespresso's Preliminary Invalidity Contentions dated Jul. 6, 2022, against U.S. Pat. No. 11,254,491, in Case No. 2:22-cv-00525-GW (AGRx).
Exhibit A-5 Invalidity of U.S. Pat. No. 11,254,491 in view of Mahlich, referred to in Nespresso's Preliminary Invalidity Contentions dated Jul. 6, 2022, against U.S. Pat. No. 11,254,491, in Case No. 2:22-cv-00525-GW (AGRx).
Exhibit A-6 Invalidity of U.S. Pat. No. 11,254,491 in view of Panesar, referred to in Nespresso's Preliminary Invalidity Contentions dated Jul. 6, 2022, against U.S. Pat. No. 11,254,491, in Case No. 2:22-cv-00525-GW (AGRx).
Exhibit A-7 Invalidity of U.S. Pat. No. 11,254,491 in view of Rossi, referred to in Nespresso's Preliminary Invalidity Contentions dated Jul. 6, 2022, against U.S. Pat. No. 11,254,491, in Case No. 2:22-cv-00525-GW (AGRx).
Exhibit A-8 Invalidity of U.S. Pat. No. 11,254,491 in view of Ruchonnet, referred to in Nespresso's Preliminary Invalidity Contentions dated Jul. 6, 2022, against U.S. Pat. No. 11,254,491, in Case No. 2:22-cv-00525-GW (AGRx).
Exhibit A-9 Invalidity of U.S. Pat. No. 11,254,491 in view of Yoakim, referred to in Nespresso's Preliminary Invalidity Contentions dated Jul. 6, 2022, against U.S. Pat. No. 11,254,491, in Case No. 2:22-cv-00525-GW (AGRx).
Espresso Coffee, The Science of Quality, Second Edition, Edited by Andrew Illy and Rinantonio Viani, referred to in Nespresso's Preliminary Invalidity Contentions dated Jul. 6, 2022, against U.S. Pat. No. 11,254,491, in Case No. 2:22-cv-00525-GW (AGRx).
11—Packaging and the Shelf Like of Coffee, ISBN 9781420078442, Food Packaging and Shelf Life: A Practical Guide (2009), referred

(56) References Cited

OTHER PUBLICATIONS to in Nespresso's Preliminary Invalidity Contentions dated Jul. 6, 2022, against U.S. Pat. No. 11,254,491, in Case No. 2:22-cv-00525-GW (AGRx).
Nestle Nespresso SA reply dated Jun. 13, 2022 to Defendant K-fee System GmbH contingent counterclaim.
Applicant statements included in the IDS Transmittal Letter filed on Jul. 27, 2022, relating to: Summary of Foreign Proceedings, Foreign Vindication Proceedings, Claim Construction Order, Preliminary Invalidity Contentions, Request for Patent Cancellation of Korean Patent No. 10-2318476, Notification of Reasons for Revocation of Japanese Patent No. 694164.
Notice of References in U.S. Appl. No. 17/844,372, dated Aug. 11, 2022.
English Translation of the Preliminary Opinion of Judge Bremi of the Swiss Federal Patent Court, dated Jan. 23, 2023.
Petition For Inter Partes Review of U.S. Pat. No. 10,994,923 (IPR2023-00502) filed by Nespresso USA, Inc. dated Jan. 24, 2023.
Declaration Of Michael Jobin (IPR2023-00502), dated Jan. 24, 2023.
Petition For Inter Partes Review of U.S. Pat. No. 11,230,430 (IPR2023-00485) filed by Nespresso USA, Inc. dated Jan. 24, 2023.
Declaration Of Michael Jobin (IPR2023-00485), dated Jan. 24, 2023.
Petitioner's Reply to Patent Owner's Preliminary Response (IPR2022-01574) filed by Nespresso USA, Inc. dated Feb. 16, 2023.
First Amended Complaint For Declaratory Judgement (Case No. 2:22-cv-9295) filed by Nespresso USA, Inc. dated Jan. 19, 2023.
English Translation of the Presentation by Nestle Nespresso SA dated Mar. 22, 2023 to the Swiss Federal Patent Court in the Swiss dispute against K-fee System GmbH.
Applicant statements included in the IDS Transmittal Letter filed on Apr. 3, 2023 concerning the IPR Petitions filed against Applicant's U.S. Pat. Nos. 10,994,923 and 11,230,430; Summary List of Potentially Relevant References; and Declaratory Judgement.
Decision Granting Institution of Inter Partes Review of U.S. Pat. No. 11,254,491B2 dated Apr. 14, 2023 (IPR2022-01574).

\* cited by examiner

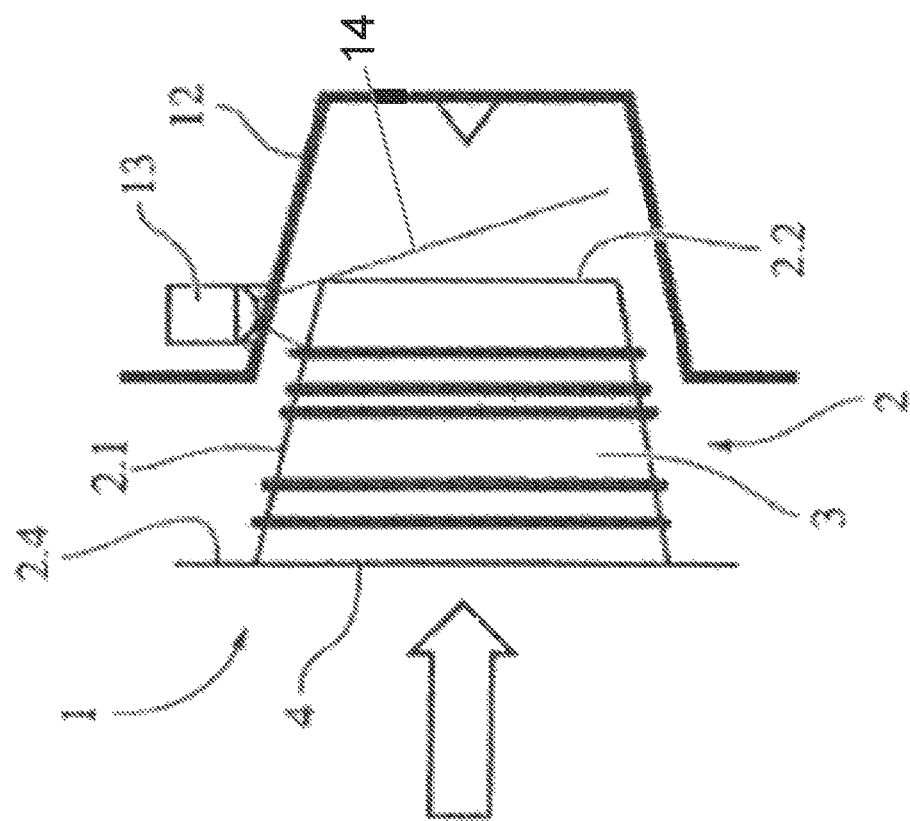
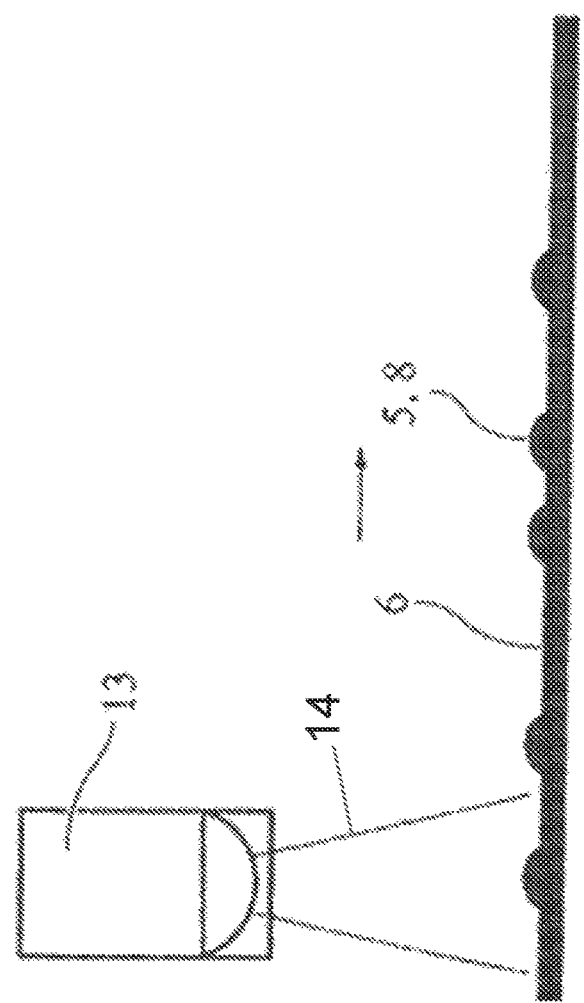
Fig. 1B
Fig. 1A

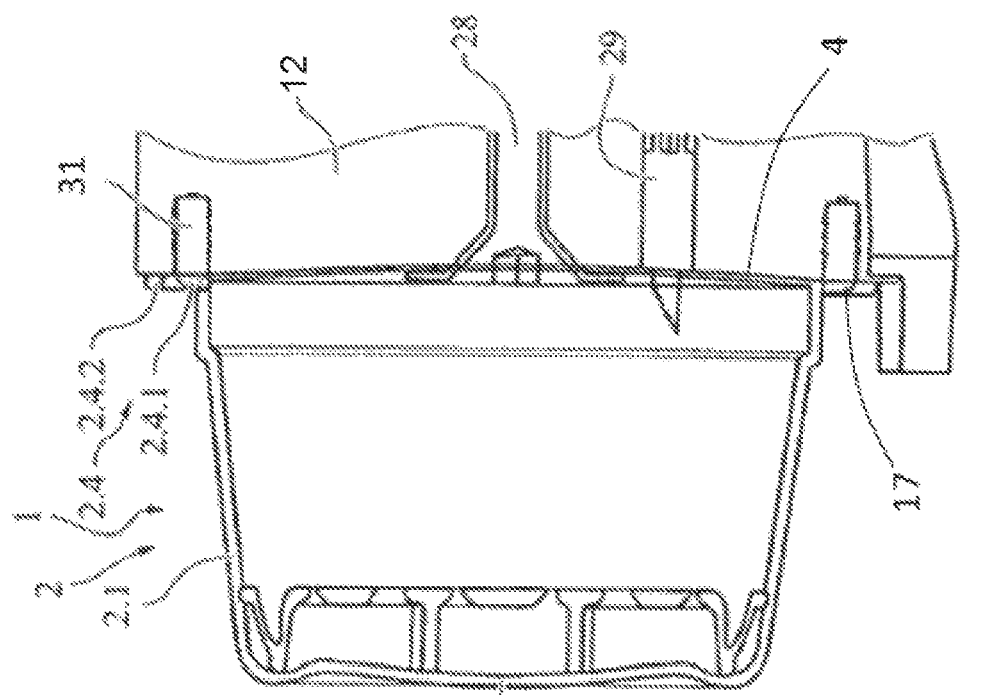
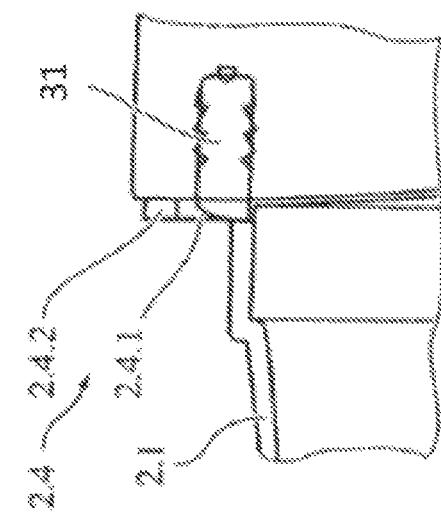

PORTION CAPSULE HAVING AN IDENTIFIER

CROSS REFERENCE TO RELATED APPLICATIONS

This application claims benefit from International Application No. PCT/EP2011/003677, filed on Jul. 22, 2011, entitled PORTION CAPSULE HAVING AN IDENTIFIER, which is hereby incorporated by reference in its entirety.

FIELD

These teachings relate to a beverage system for making a beverage that includes a portion capsule and a beverage machine.

BACKGROUND

The present invention relates to a portion capsule for producing a beverage, comprising a base element having a cavity in which a beverage raw material is provided and which is closed by a membrane fastened to the base element.

Such capsules are well known and are being launched onto the market in abundant variety. Since these capsules are often quite similar, it is possible that the manufacturer's capsules are used in a coffee machine designed by another manufacturer, although they are not suited for it. This may result in significant security issues and/or the coffee machine may be damaged.

The object of the present invention is therefore to provide a portion capsule which only is suitable for a specific coffee machine.

SUMMARY

The object is accomplished according to the present invention by a portion capsule for producing a beverage, comprising a base element having a cavity in which a beverage raw material is provided and which is closed by a membrane fastened to the base element, wherein it has an identifier, which allows to individualize the respective portion capsule.

The present invention relates to a capsule for producing a beverage or foodstuff, comprising a base element having a cavity in which a beverage raw material is provided. Such capsules are, for example made of plastic, natural materials and/or biodegradable materials and substantially have a base element, in particular a deep-drown base element, i.e. it is substantially designed frustoconically or cylindrically. The beverage raw material is arranged within the portion capsule's cavity and is extracted and/or dissolved in a liquid, in particular water. After the beverage raw material has been filled into the cavity the base element is usually sealed by a membrane. In particular the membrane is localized on the opposite side of the base element's bottom. The membrane can be made of the same or different material as the base element and is substantially attached to the base element using a sealing and/or an adhesive bonding. Additionally, the cavity could contain one or several built-in elements, such as, for example a filter, a non-woven, a felt, a shut-off device and/or something similar to those. For the case that a non-woven and a felt are arranged within the cavity, they are interconnected preferably. The non-woven and/or the felt can be made of several layers in such a way that the layers may differ in the kind of its starting material and/or its preparation. Moreover, the membrane and/or the bottom can be provided with a plurality of recesses (holes).

According to the present invention, it is provided that the portion capsule has an identifier that allows to individualize the respective portion capsule. In the context of this invention individualizing means that the respective portion capsule can be assigned to a group of capsules that are suitable for the coffee machine preferably. It is not necessary that the coffee machine is able to specify and/or identify the portion capsule. In fact, it is much more important that the coffee machine associates the portion capsule with a group of portion capsules, which is suitable for the coffee machine. In particular, individualizing means that those portion capsules that are not appropriate for the coffee machine cannot be inserted into and/or directly fall through the holder, which is designed for the portion capsules in the coffee machine, and/or the coffee machine operates only with the corresponding portion capsules. Preferably a sensor/detection system handles the identifier and compares it with a stored reference substantially. Preferably, the coffee machine, in particular the water-providing-pressure pump, will be activated if the detected identifier matches with the reference. Otherwise, the coffee machine will not start operating. Preferably the detection system is placed in the region of the coffee machine's media chute designed for the portion capsules. According to another preferred embodiment of the invention, the detection system may be placed in the region of the brewing chamber. Another possible embodiment of the invention provides that the identifier prevents portion capsules from inserting into the coffee machine. Alternatively, or additionally, means, in particular mechanical means, more preferably, one or more gearwheels, may be added to the media chute in order to guarantee that incorrect portion capsule cannot be inserted into the coffee machines by passing the media chute.

Preferably, the identifier is composed of surface areas having different optical properties, for example reflection. These surfaces may be localized on the membrane, the side wall and/or the bottom of the portion capsules. Preferably, the portion capsule has at least two areas which differ in their optical properties, for example the reflection characteristics.

The detection of a recess and/or a bulge is also preferred. Preferably, recess and bulges alternate and/or at least two recesses or bulges are separately placed from each other. Especially it is possible that the recess and/or the bulge form a gearwheel that is attached to the outer border and/or at least partially extends to the wall region of the portion capsule. The recess and/or bulge may be produced by any shaping method, for example by deep drawing, preferably.

Furthermore, the recess may be realized by removing material. In particular, the material's removal can be accomplished by punching or using a laser on condition that this processing does not damage a barrier layer placed in the portion capsule's material, which prevents moisture or aroma from escaping out of the portion capsule and/or water vapor or oxygen enters the capsule. The reading of the identifier, which is encoded in the recess and/or bulge, may be a result from a mechanical and/or optical method, for example. Alternatively, or additionally, the identifier can be used to avoid that the portion capsule is inserted into the coffee machine. This applies in particular to the media chute. For example, it is possible to design a portion capsule comprising a ring gear that is placed on its circumference and is compatible with another ring gear, which is placed in the media chute. If the media chute's ring gear only revolves for a corresponding ring gear of the portion capsule and its revolving allows the portion capsule to pass, only portion capsules equipped with the proper ring gear will pass the insertion lock.

According to a further subject matter of a preferred development of the present invention, the identifier may be included in the membrane. Preferably, the identifier is a layer or partial layer of the membrane. Such identifiers may be an optically detectable material, for example a fluorescent material. Furthermore, the identifier may be designed with layers made of metal or ferrous metal or stripes made of metal or ferrous metal in or on the membrane, respectively.

Preferably the identifier is a machine-readable imprint. This is realized with a print in food approved color, preferably. Fluorescent materials like paper or print materials, whose optical properties change under the influence of temperature, are favored also. Preferably the print is a barcode, a logo or a repeat pattern.

According to a further subject matter of a preferred development of the present invention, the identifier is an electrically conductive section, which can be placed all over the portion capsule, but is localized on the side wall, the edge and/or the floor preferably. The electrically conductive section, which is inserted into the coffee machine, can become part of an electric circuit, and causes therefore a measurable change, which leads to the identification of the respective portion capsule. In a further preferred embodiment, the identifier is a section made of a ferromagnetic material.

Another construction version favors a RFID chip being the identifier.

If the portion capsule is customized according to the invention, portion capsules that are not in line with the coffee machine will be prevented from inserting into the coffee machine. Furthermore, it is possible that the identifier allows to identify the portion capsule located in the brewing chamber in such a way that the production process of beverage or food may be controlled, for example by adjusting the temperature, the pressure and/or the amount of water.

According to a further subject matter of a preferred development of the present invention, the portion capsule's material is weakened in the bottom area caused by a selective material removal, for example by using a laser. The weakening is provided for piercing the portion capsules using a mandrel. This procedure is needed for the beverage's preparation. Since the material is weakened in the section, which is treated with a laser and is supposed to be pierced using the mandrel, the degree of necessary force for piercing the portion capsule is reduced. The mandrel of such coffee machines is usually equipped with a force limitation that limits the force, which is dedicated for pressing the mandrel against the portion capsule's bottom. This preparation avoids that portion capsules having no appropriate weakening can be used in such a coffee machine. Consequently, the weakening represents another kind of identifier.

According to a further subject matter of a preferred development of the present invention, the portion capsule has an edge region, which is preferably attached to the base element. Preferably, the edge is located opposite of the base element's bottom area. After the raw material has been filled in the portion capsule, a membrane can be attached to this edge region, for instance. Moreover, the edge can also designed for guiding the portion capsule into the chute in order to position the portion capsule in the brewing chamber properly. Simultaneously, it is possible to use the surface of the edge for stopping and/or sealing.

Preferably provision is made for the portion capsule to have means for fit locking, friction locking and/or detection in the edge region. The means for fit locking and/or friction locking may be used to activate a complementary mechanism, which is located in the coffee machine, in order to allow inserting the portion capsule into the coffee machine and/or starting a sensor, like a gearwheel, that transmits a signal to a control unit depending on whether the portion capsule corresponds to the coffee machine or not. Alternatively, or additionally, a detector may identify the mean for fit locking, friction locking and/or detection in order to check that the portion capsule is suitable to the respective coffee machine.

Preferably, the means for fit locking, friction locking and/or detection is a gearwheel or a gearwheel segment, which are located, in particular, in the outer area of the edge region. The teeth of the gearwheel or the gearwheel segment may be shaped in any commonly used form, which is known, for example, by an expert from gear manufacturing. Preferably, it is provided that these teeth are triangular, rectangular, square, or wavy.

Preferably, there is a sealing surface, that is arranged on the interior side relative to the gearwheel or the gearwheel segment.

Another and preferred state-of-the-art technology is a portion capsule for producing a beverage, comprising a base element substantially designed frustoconically or cylindrically, having a cavity in which a beverage raw material is provided and which is closed by a membrane fastened to the base element with the base element having a wall region and the base element having a bottom area, which is preferably located opposite to the membrane, with the wall region having several grooves and the grooves which are located between membrane and bottom area covering the wall region along its height at least partially. The grooves may be also located in the edge region, in particular on the outer area of the edge region.

This portion capsule has the advantage over the portion capsule according to the state-of-the-art technology that, for instance, the grooves reinforce the base element's wall region. On the one side, these grooves make the portion capsule more stable towards mechanical forces and prevent the portion capsule from deformation and buckling, in particular. The arrangement of the grooves, which are located at the wall region, additionally improves the performance of the portion capsule while the extraction liquid flows through it in the brewing chamber, since the arrangement of the grooves, in particular those partially expending over the wall region between membrane and bottom area, increase quality and reliability of the extraction process significantly. According to the invention another advantage is that the base element's thickness can be reduced, because the use of grooves improves the physical stability. The production of the portion capsule is therefore much less expensive and more environmentally friendly. On the other side, the grooves reduce or avoid the contact between the portion capsule's wall region and the wall of the brewing chamber. As a result, ejecting or removing the portion capsule from the brewing chamber is made easier. Another advantage of using a plurality of grooves is that the stream of the extraction liquid, which flows along the base element in the cavity, can be optimized by choosing a grooves' structure that is able, for example, to generate on the one hand a better or stronger turbulence in the extraction liquid or on the other hand a more uniform (laminar) flow of the extraction liquid, in the wall region. The control of the liquid may be obtained by the structure of the grooves itself or by using simple means additionally. A stronger turbulence compared to the one known in the state-of-the-art has the advantage that no unintended and casual main streams are formed in the raw materials. Instead, the extraction liquid equally flows through the raw material in all of the volume. Thus, the extraction process is much more efficient and can be controlled more precisely and reproducibly.

In particular, the raw material may be coffee powder (especially ground roasted coffee), chocolate powder, milk powder, tea, or the like. Alternatively, it is conceivable that the raw material is a beverage's extract, such as instant coffee for example.

In particular, the grooves are recesses and bulges, which are preferably directed along a main extension and are preferably extended along the wall portion or the periphery of the edge region. More preferably, the grooves are formed as webs and/or notches. A gearwheel, for instance, may be obtained by the grooves. Therefore, the grooves are part of the base elements' wall, optionally located on the inner side facing to the cavity and/or on the outside facing away from the cavity.

According to a preferred embodiment of the present invention, it is provided that the grooves form an identifier that allows individualizing the portion capsule. In the context of this invention individualizing preferably means that the respective portion capsule can be assigned to a group of capsules that are suitable for the respective coffee machine or the machine producing a beverage. It is not necessary that the coffee machine or the device for producing a beverage is able to specify and/or identify the portion capsule. It is more important that the device for producing a beverage, in particular a coffee machine, associates the portion capsule with a group of portion capsules, which is appropriate for the respective device for producing a beverage, in particular a coffee machine. In particular, individualizing means that those portion capsules that are not appropriate for the coffee machine (or the device producing the beverage) cannot be inserted into and/or directly fall through the holder, which is designed for the portion capsules in the coffee machine (or the device producing the beverage), and/or the coffee machine (or the device producing the beverage) operates only with corresponding portion capsules ("proper portion capsule"). In particular, individualizing means that the coffee machine or the device producing the beverage will not operate properly in the intended use, if the used portion capsule is not customized according to the invention. Preferably, a sensor/detection system, attached to the coffee machine or the device producing the beverage, records the identifier and substantially compares it with a stored reference. In particular, it is possible that such an identification process is based on a mechanical fitting, especially a fitting of a gearwheel or of a contour comparable with a gearwheel, which is attached to the device producing the beverage or the coffee machine and interacts with the portion capsule. It is preferred that the device for producing the beverage or the coffee machine only will operate, if the identifier matches to the reference or the mechanical fittings match with each other. In this case the device for producing the beverage particularly starts to operate, especially activates a pressure or water pump. The mean for detection or mechanical fitting is preferably located in the region of the media chute or in the region of the device for producing the beverage. Alternatively, the identifier or the mechanical fitting may avoid that an unsuitable portion capsule is inserted into the device for producing the beverage. A portion capsule, which is designed in accordance with the invention, makes it possible that a portion capsule that is not designed for the device for producing a beverage cannot be inserted into it. Additionally, the identifier allows that the device for producing the beverage, especially the coffee machine, may specify the sort of the portion capsule and thereby control the production process of beverage and food by adapting, for example, the pressure, the temperature and/or the amount of water.

According to a further preferred embodiment of the present invention, it is provided that at least a part of the grooves and at least in a subarea parallel to the main plane of the membrane is gearwheel shaped.

According to the present invention, it is an advantage that it is possible to increase the stability of the portion capsule's wall region, to realize improved turbulences of the extraction liquid and thereby to improve the extraction's process under the same conditions, for example, such as material thickness and the like. Another advantage is that it is easy to generate a mechanical identifier or a mechanical fitting that matches with a fitting tool that belongs to the device for producing a beverage. According to the invention it is an further advantage that, for example, a gearwheel, which is attached to the device for producing a beverage and is, for example, located in the region of the media chute or similar, can possibly interacts with the gearwheel's contour of the portion capsule. In this way it is possible to generate a mechanical fitting that allow to individualize the portion capsule as a proper one and/or to specify the sort of portion capsule and/or to rotate the portion capsule about an axis of rotation, that is perpendicular to the membrane's main plane, by using the gearwheel's arrangement. Such an embodiment of the invention makes it possible that the portion capsule is always opened with the device for producing a beverage on the same spot (with respect to its angular position) and therefore the raw material is extracted on the same manner. Moreover, the grooves prevent the portion capsule from being inserted into the coffee machine.

In a preferred version of the invention, it is provided that there is a flange/edge region being averted from the bottom region, for fixing the membrane to the base element, where in the wall region between flange/edge region and bottom region preferably has a border and the grooves are being preferably extended to this border.

Because of this it is another advantage according to the invention that on the one hand the wall region can be constructed in a stable and reinforced manner and on the other hand the gearwheel shaped contour of the grooves, located at the wall region, is able to absorb a relative high load. With that it is possible that the portion capsule can be rotated easily and without any damaging of the portion capsule within the device for producing a beverage.

Preferably, the base element's diameter is enlarged in the border's region compared to the wall region, which range from the border to the bottom region.

This gives rise to the advantageous possibility to stack portion capsule or portion capsules' base elements easily and robustly.

Moreover, it is preferred that at least a part of the grooves are gearwheel shaped and at least a plane, which is at least partially gearwheel shaped, is parallel to the membrane in such a way that the gearwheel shaped contour expands over the borders or the flange/edge region.

Further preferred versions of the present invention relate to portion capsules that implement one or more of the following characteristics:
  the base element tapers in the direction of the flange in the border's region,
  the grooves directed toward the bottom region expand over the border's region, the grooves approximately cover 20%-80%, preferably 40%-60% of the wall region, which is placed between the border and the bottom region, the grooves are constructed in such a way that the wall region is reinforced and/or the grooves causes an extraction liquid's turbulence in the cavity.

Other preferred versions of the present invention relate to portion capsules that are manufactured in such a way that the ratio of the diameter of that wall region of the base element which adjoins the flange to the diameter of the flange is between 0.85 and 0.89, and in particular substantially 0.87.

In a preferred version, the wall region's diameter, which is adjacent to the flange, is 39 millimeters and the flange's diameter is 45 millimeters. Another advantageous version of the invention prefers a base element having a thicker wall region in the border's region compared to the wall region between bottom region and flange. Since the portion capsule's design, which contains grooves in the wall region, improves its stability, it is possible to save material by manufacturing the portion capsule and therefore to reduce cost and energy required for manufacturing the portion capsules.

According to the invention it is further provided that a filter element is arranged into the cavity. Such a filter element divides the cavity into a first region for accommodating the beverage raw material and into a second region for accommodating a beverage extract. In particular, it is provided that the filter element is made of a non-woven material.

According to a further subject matter or a preferred development of the present invention the portion capsule according to the invention is intended for the preparation of a hot beverage. In the following the invention is explained based on the FIGS. 1-22. These explanations do not restrict the general idea of the invention.

BRIEF DESCRIPTION OF THE DRAWINGS

FIGS. 1A and 1B show a portion capsule containing sections that differs optically.

FIGS. 16A and 16B show a portion capsule with a gearwheel placed in the brewing chamber.

DETAILED DESCRIPTION

Figure 2B:
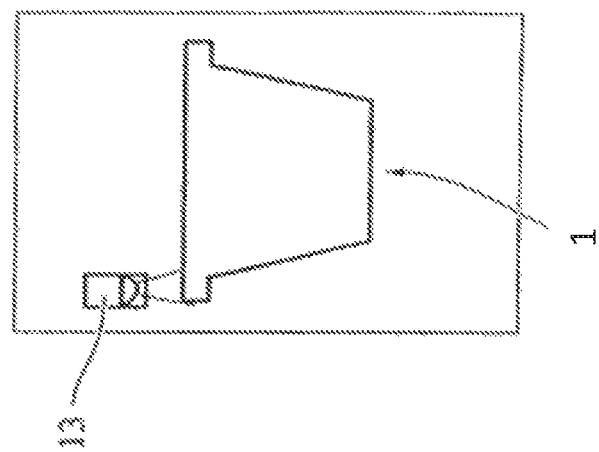
FIGS. 2A, and 2B show a portion capsule containing a barcode.

FIGS. 1A and 1B show a portion capsule 1 comprising a base element 2 that has a wall region 2.1 and a bottom area 2.2. The wall region 2.1 and the bottom area 2.2 define a cavity 3, which may include the raw material and perhaps a built-in element. After filling, the cavity 3 is sealed by a membrane 4, which is preferably attached to the edge region 2.4 of the base element using seal or glue. This portion capsule can be inserted into a brewing chamber 12, with a liquid, in particular water, flowing through it. During this process, the raw material is extracted or dissolved and therefore the beverage is produced. According to the invention the portion capsule has only one identifier that allows to determine whether the respective portion capsule goes with the coffee machine's brewing chamber 12 and the parameters for processing are chosen properly. If it is not the case, significant security issues arise. Inserting the wrong portion capsule, for example, endangers the brewing chamber's tightness. In this case hot water can be discharged under high pressure and therefore compromise the user's safety. Otherwise, it is also possible that inserting the wrong portion capsule damages the coffee machine. In this example the identifier is represented by several raised areas 8, which differ in reflection properties from the sections between the raised areas. As shown by the arrows the bulges are passed by a mean for detection 13 (here: an optical detector) that is able to differentiate between the unequal sections 5, 6 having different optical properties such as, for example, reflection. Switching between the different sections or the number of bulges represents the identifier. After the identifier has been read out the identifier is compared to a stored reference. If the identifier agrees with the reference, the coffee machine will start operating. Particularly the pump, which is for example responsible for pushing hot water through the brewing chamber, will not start operating, if the identifier does not agree with the reference.

All the remarks concerning the identifier apply to all the examples.

Figure 2A:
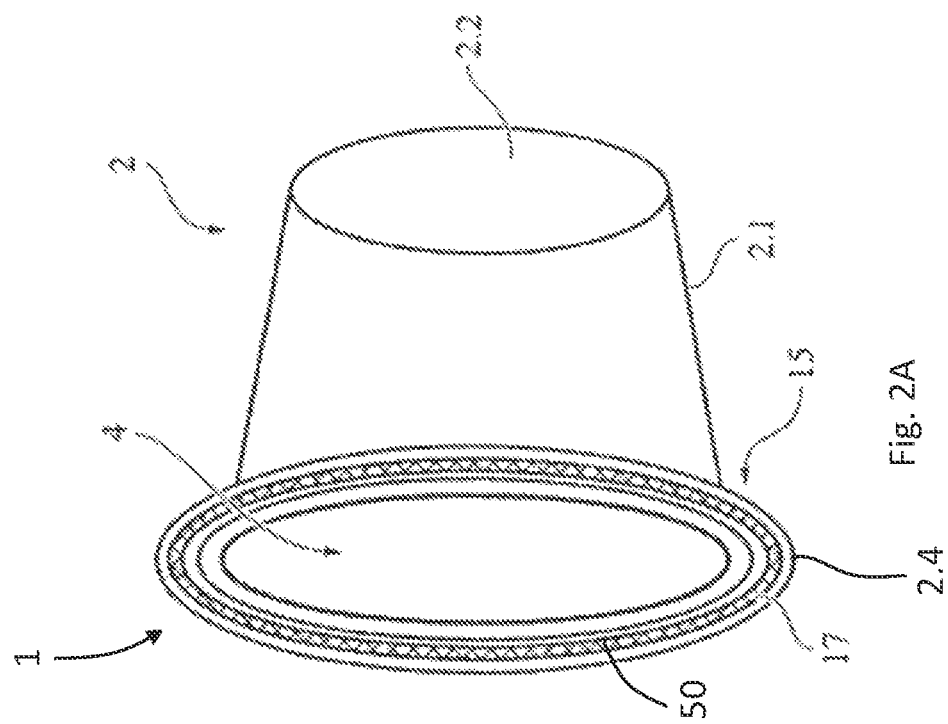

FIGS. 2A and 2B show another embodiment of the portion capsule 1 according to the invention. The portion capsule 1 comprises a base element 2 that has a wall region 2.1 and a bottom area 2.2. Here the portion capsule 1 has a barcode 50 placed in the area of the membrane's 4 top surface. This barcode may be printed by material removal or may be generated by a medium that is integrated in the foil and can be detected optically such as a fluorescence agent. Alternatively, metal rings may be part of the foil or attached to the foil. The barcode's section may be made of a ferromagnetic material. As shown by the arrow 15 the barcode 50 alternatively can be attached to the base element's edge region being averted from the membrane 4. Such a barcode is read out by a detector 13 placed, for example, in the media chute. The barcode represents the identifier according to invention.

Figure 3A:
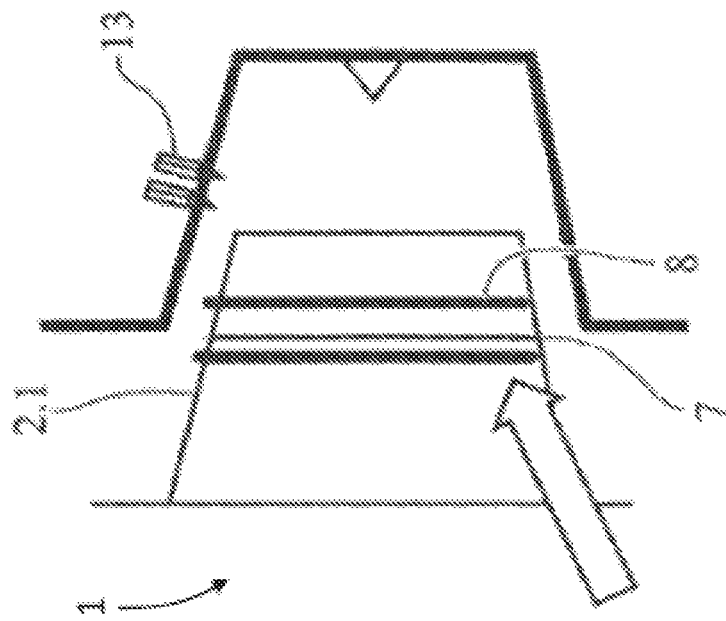
FIGS. 3A and 3B show a portion capsule with recesses and bulges.
Figure 3B:
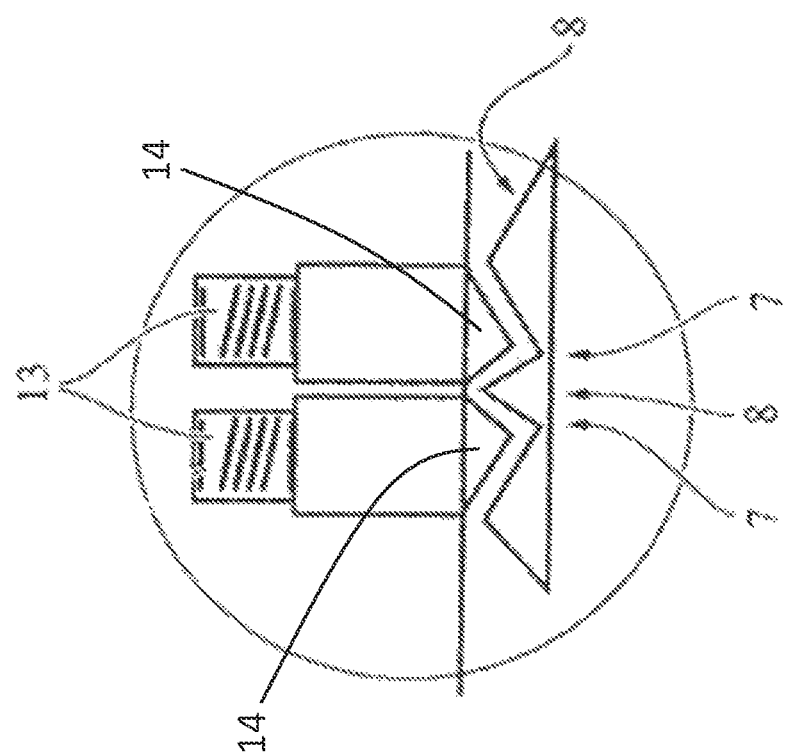

FIGS. 3A and 3B show another embodiment of the portion capsule 1 according to the invention. In the present case the identifier comprises recesses and bulges 7, 8, which result from material removal or reshaping the portion capsule as shown here by the example of the portion capsule's wall 2.1. In the present case, recesses and bulges interact with a means for detection 13, which operates like a key, wherein the coffee machine only start operating, when all elements 14 are placed in the respective recess 7. Therefore, an electric circuit may be changed or especially closed.

Figure 4:
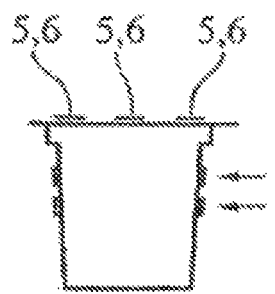
FIG. 4 shows a portion capsule containing sections that differs optically.

FIG. 4 shows an embodiment of the portion capsule being substantially identical to the embodiment illustrated in FIG. 1. As an alternative version of the invention, the figure additionally shows that the unequal sections 5, 6 differing in terms of optical properties can be attached to the cover foil, for example in the form of a barcode.

Figure 5:
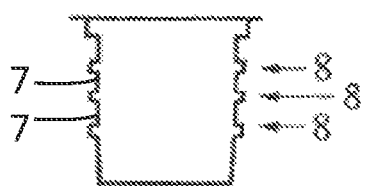
FIG. 5 shows a portion capsule with a key function.

FIG. 5 shows an embodiment of the portion capsule being substantially identical to the embodiment illustrated in FIGS. 3A and 3B that includes recesses 7 and bulges 8. Again, the recesses represent the key bit. The coffee machine only will start operating, if the recesses interact with the corresponding bulges and therefore an electric circuit is changed respectively. The placement of such a system is not restricted to the brewing chamber. For instance, the system may be placed in the portion capsule's media chute.

Figure 6:
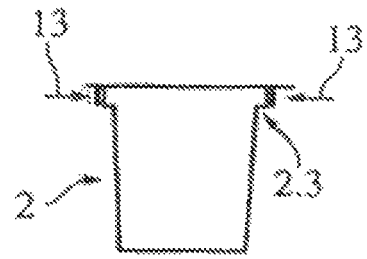
FIG. 6 shows a portion capsule's wall that is electrically conductive.

FIG. 6 shows a version of the invention that includes a base element 2 and an electric material forming a surrounding ring 2.3, which preferably has a raised form. The electrically conductive material is scanned by means for detection 13 having electric sliding contacts, which are placed in the media chute and form electric contacts of an electric circuit, while the portion capsule is inserted.

Figure 7:
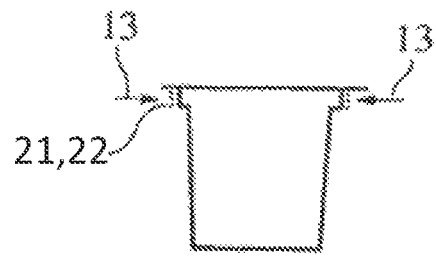
FIG. 7 shows a portion capsule's wall containing sections that differs optically.

FIG. 7 shows an embodiment of the portion capsule being substantially identical to the embodiment illustrated in FIG. 6, in which it is provided that the ring area has reflective 21 or mat 22 sections, for example in form of a covering, and allows a read-out by means for detection 13 for optical detection, which are placed in the media chute and are part of a control current, while the portion capsule is inserted.

Figure 8:
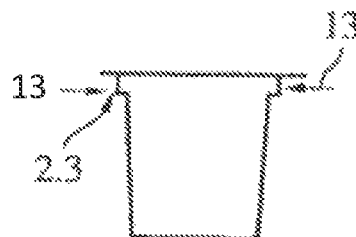
FIG. 8 shows an enlarged pot construction of the portion capsule's wall.

FIG. 8 shows a relative broad and raised ring 2.3 which represents the identifier. The media chute is equipped with a corresponding vacancy that tests whether the portion capsule has the proper identifier. The broad ring is scanned, for example, by means for detection 13 having mechanical sensors, which are placed in the media chute and close the contacts of an electric circuit, while the portions capsule is inserted.

Figure 9:
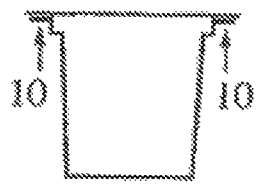
FIG. 9 shows an edge region that is electrically conductive.

FIG. 9 shows another embodiment of the portion capsule according to the invention. In the present case an electrically conductive coat 10 is integrated in the edge region's back and is scanned by electric sliding contacts, which are placed in the media chute and form electric contacts of an electric circuit, while the portion capsule is inserted.

Figure 10:
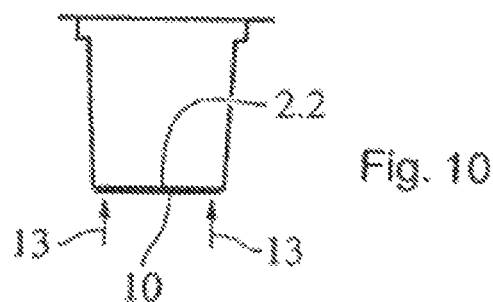
FIG. 10 shows a portion capsule containing a bottom that is electrically conductive.

FIG. 10 shows another embodiment of the portion capsule according to the invention. In the present case the portion capsule has an electrically conductive coat 10 at the bottom area 2.2 such as a conductive varnish layer or an aluminum foil. The coat is scanned by means for detection 13 having electric sliding contacts, which form electric contacts of an electric circuit, while the portion capsule is inserted.

Figure 11:
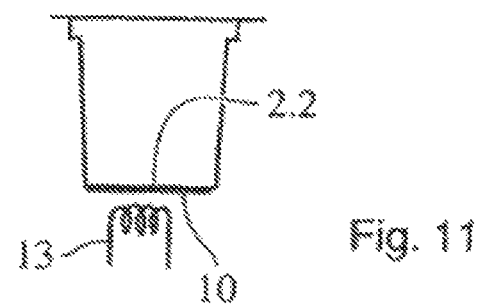
FIG. 11 shows an embodiment containing a layer that can be detected by a metal detector.

FIG. 11 illustrates a version of the portion capsule having also an electrically conductive coat 10 that is placed on its bottom 2.2 and is identified by a means for detection 13 having a metal sensor, which is placed in the chute and, for example, detects inductively, while the portion capsule is inserted.

Figure 12:
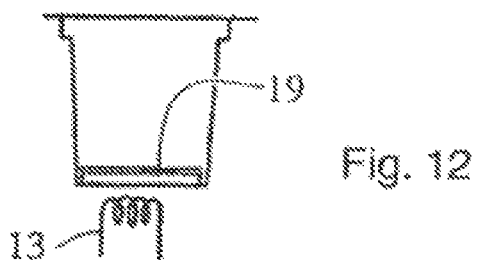
FIG. 12 shows a metallic strainer.

The embodiment of the invention shown in FIG. 12 has a built-in element made of metal (here a strainer 19) that is recognized as identifier by a means for detection 13 having a metal detector.

Figure 13:
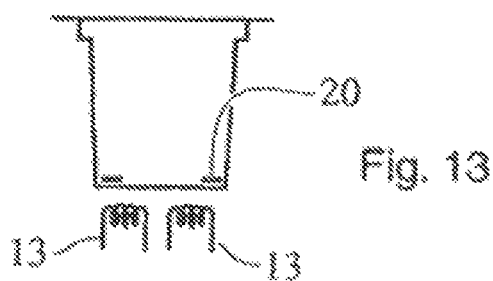
FIG. 13 shows a portion capsule containing a ferromagnetic section.

The version of the invention shown in FIG. 13 includes a ferromagnetic material 20 placed at the portion capsule' bottom. The identifier is scanned, by means for detection 13 for example, by a magnet, which is placed in the chute, while the portion capsule is inserted. The ferromagnetic material acts as identifier.

Figure 14:
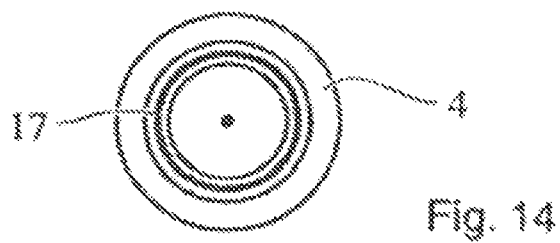
FIG. 14 shows a portion capsule containing a barcode.

FIG. 14 shows another embodiment which includes a barcode placed in the region of the cover foil. The portion capsule includes a flange 17.

Figure 15:
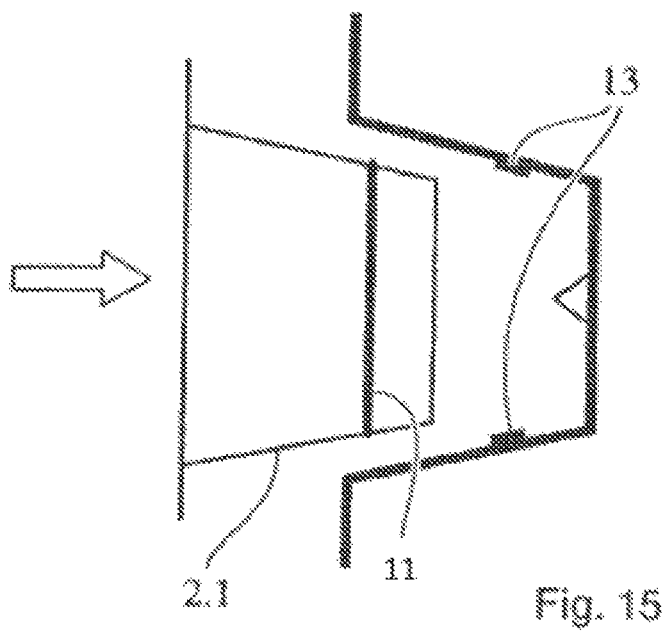
FIG. 15 shows a portion capsule containing a section, which is electrically conductive, in the wall.

According to the embodiment shown in FIG. 15 a metallic ring 11 is integrated in the wall region 2.1 and closes means for detection 13 having an electric circuit placed in region of the brewing chamber.

FIGS. 16A and 16B show another embodiment of the portion capsule 1 according to the invention. The illustrated portion capsule features a base element 2 that is basically conical-shaped in the present case and has a bottom region 2.2 and a wall region 2.1. It is provided that the base element contains the raw material and, if necessary, build-in elements like a filter as illustrated here. The expert knows that the build-in element may also include other build-in elements. A flange 17/edge region 2.4, which is preferably circular and, for example, may be used for sealing a cover foil 4 to it, is attached to the end of the base element, which is placed opposite to the bottom. The flange/edge region has means for fit locking, friction locking and/or detection 2.4.2 in the outer area (outer circumference). As especially shown in the FIGS. 17a-17c the means for fit locking, friction locking and/or detection 2.4.2 is, in the present case, a gearwheel that is formed by several recesses/bulges evenly arranged in the edge region. Preferably, it is provided that the edge region has a sealing surface 2.4.1, which sealingly interacts with the seal 31 attached to the brewing chamber 12, on the interior side of the gearwheel. The sealing 31 makes sure that the water coming from a water inlet 28 flows through the portion capsule by passing an opening, which has been made by a mandrel 29, than around it.

Figure 17A:
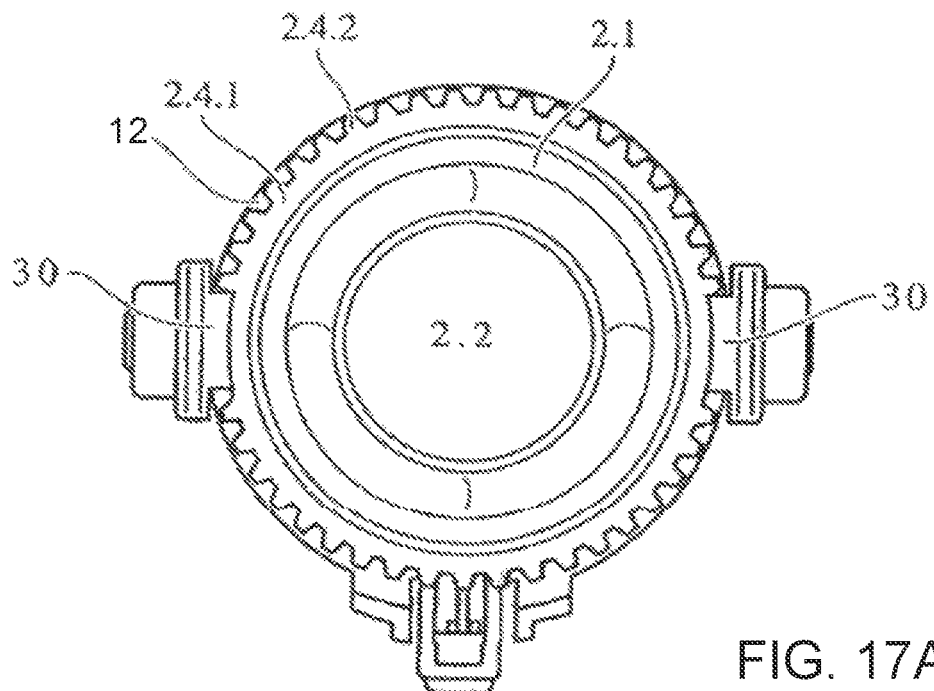
FIGS. 17A, 17B, and 17C show different embodiments of the portion capsule according to FIGS. 16A and 16B.
Figure 17B:
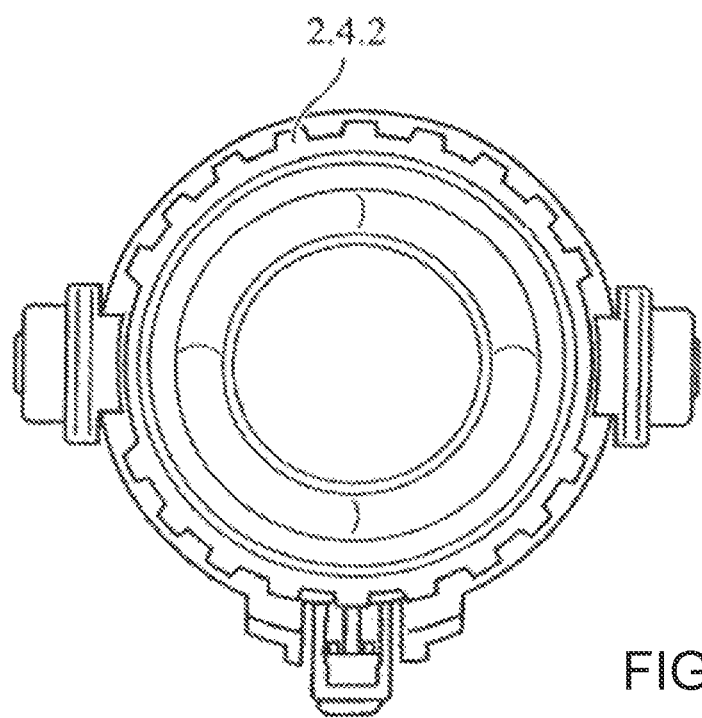
Figure 17C:
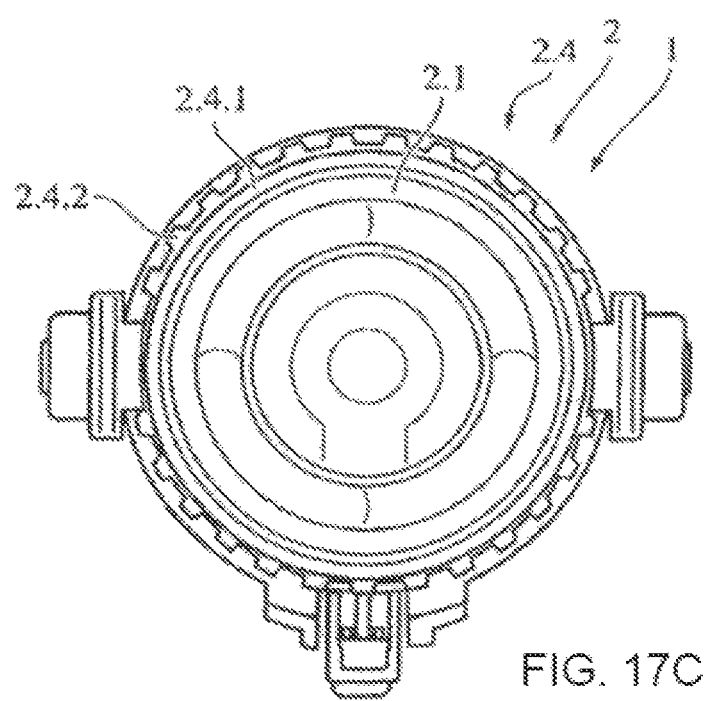

FIGS. 17A, 17B, and 17C show different embodiments of the means for fit locking, friction locking and/or detection 2.4.2. According to the version shown in FIG. 17A, the gearwheel has forty-five teeth. According to the version shown in FIG. 17B or 17C, the gearwheel has twenty-two or twenty-nine teeth, respectively. The expert knows that the manufactured teeth can be shaped arbitrarily. All FIGS. 17A, 17B, and 17C demonstrate how the portion capsule 1 can be held by a part of the brewing chamber 12 using two holding arms 30. The holding arms interact with the means for fit locking, friction locking and/or detection 2.4.2. If they are not available, the holding arms will not hold the portion capsule and the portion capsule will not be inserted into the brewing chamber and will fall through it into a dropping box instead. The portion capsule has a base element 2, a wall region 2.1, a bottom area 2.2, a sealing surface 2.4.1, and an edge region 2.4.

Figure 18:
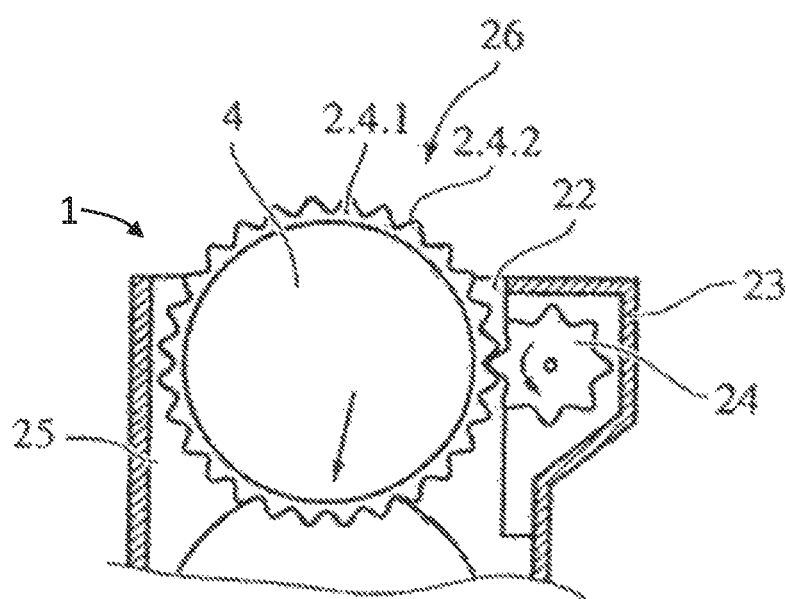
FIG. 18 shows the portion capsule according to the FIGS. 16A and 16B and FIGS. 17 a-c, when the portion capsule is fit locking with a gearwheel.

FIG. 18 shows the means for fit locking, friction locking and/or detection 2.4.2 along with mean for fit locking 24, which is attached to the coffee machine and is represented by a pinion here. It is provided that the mean for fit locking 24 is placed in the media chute or insertion shaft 26 of an insertion shaft housing 23 having a port for inserting the portion capsule in the coffee machine. The distance between the inner wall 25 of the portion capsule 1 and the mean for fit locking 24 represented by the pinion 24 are designed in such a way that the portion capsule only will pass the port, if the means for fit locking, friction locking and/or detection 2.4.2 is formed complementary to the teeth of the mean for fit locking 24 represented by the pinion. Only in this case the portion capsule rotates the mean for fit locking 24 represented by the pinion 24 while it falls. Both rotating and falling are represented by arrows in the figure. The portion capsule needs the rotation for passing the media chute's port and falling in the intended position afterwards. If the portion capsule has no or wrong mean of fit locking, it will be impossible to place the portion capsule by passing the media chute in the intended position. Additionally, or alternatively, it is provided that the mean for fit locking 24 represented by the pinion has a pick-up that detects the rotary movement and transmits it to a control unit. If the rotation at least corresponds a defined rotating element, the control unit will activate, for example, the brewing unit. The expert knows that the portion capsule's border may include means for friction locking that interacts with a mean, for example an edge, and shift it in such a way that the shift is detected and therefore the brewing chamber is activated. The portion capsule 1 has a cover foil 4 and a sealing surface 2.4.1.

The expert moreover knows that a sensor, being for example a camera, which detects the form of the means for fit locking, friction locking and/or detection 2.4.2, may be installed in the media chute. In the present case the form and/or the distance between the teeth may be detected. If the proper portion capsule was inserted, a resulting signal could be transmitted to a control unit, which activates the brewing chamber.

Figure 19:
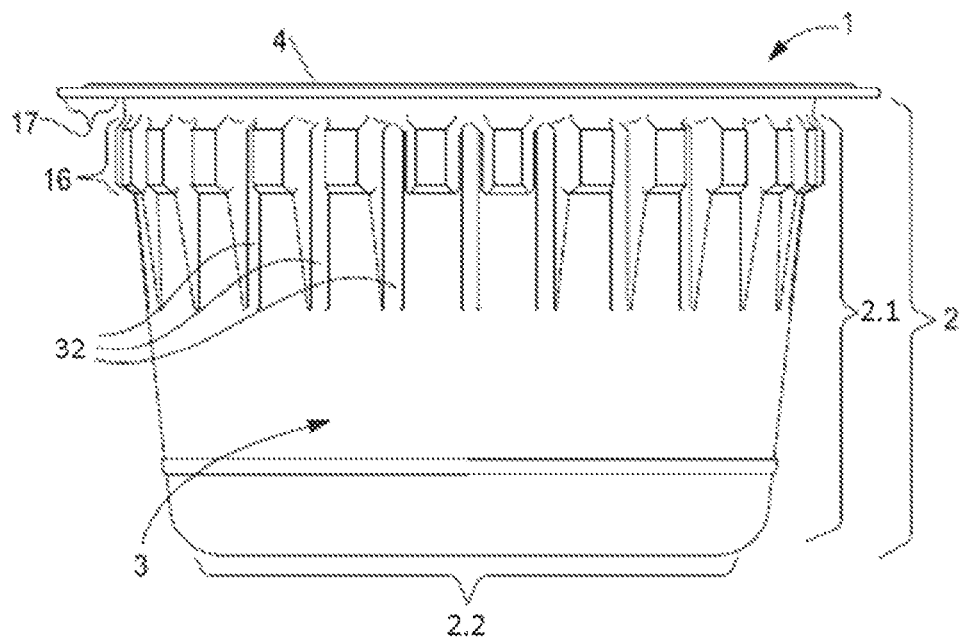
FIGS. 19 and 20 show a schematic view of a portion capsule according to an embodiment of the presented invention.
Figure 20:
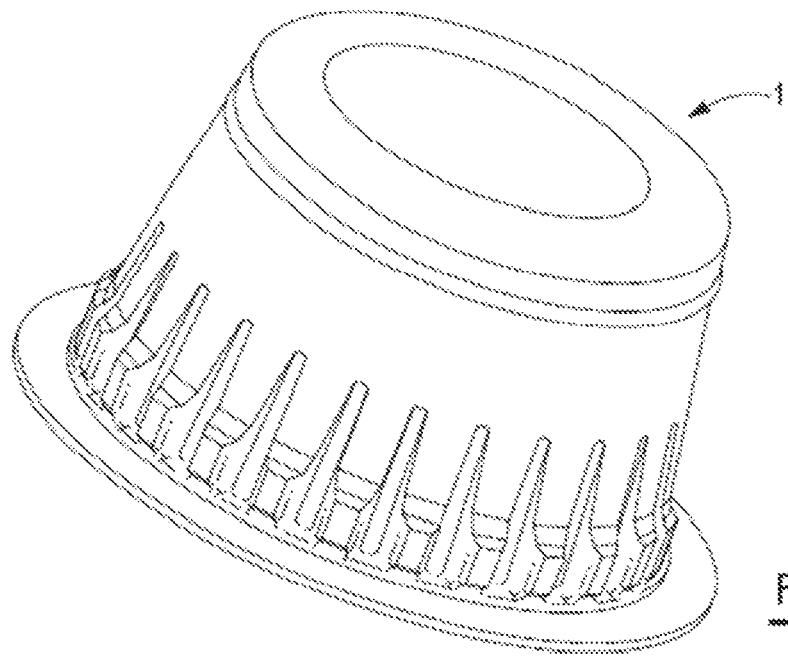

FIG. 19 schematically shows a view of another portion capsule's version according to an embodiment of the present invention. FIG. 20 illustrates the same portion capsule from a different point of view schematically. FIG. 19 shows the front view of the portion capsule. FIG. 20 shows the portion capsule viewed from an angle below. In all figures the portion capsule is labeled with the reference sign 1. The portion capsule substantially has a frustoconically shaped base element 2, which is formed similar to a pot and encloses a cavity 3. The cavity 3 is sealed by a membrane 4. Since the viewing direction of FIG. 19 is essentially parallel to the plane, in which the membrane is located, the membrane is at the upper edge of the portion capsule. In particular, the base element 2 comprises a soft, semi-rigid or rigid plastic material which is deep-drown, preferably. The membrane comprises a foil made of plastic material or aluminum. Preferably the base element has a circumferential mounting flange 17 in the region of the membrane, with the membrane and the mounting flange 17 being firmly bonded, in particular by welding or gluing. Preferably a filter element, which is not specifically depicted in the figures, is placed within the base element 2. For instance, the filter element is made of thermoplastic resin such as, for example, polypropylene. The filter element could also be made of a non-woven material such as, for example, thermoplastic resin. Preferably the filter element divides the cavity 3 in two sections. It is provided that the first section can be filled with a raw material and the second section can be filled with and particularly collect a beverage's extract, which is not shown, during the extractions process. Both sections are not illustrated individually.

The portion capsule is intended for inserting into a brewing chamber or a device for producing a beverage, which is not shown here. In particular such a device for producing a beverage is a coffee machine. The device for producing a beverage could be also a machine that produces a tea drink, a chocolate drink or any other beverage. Preferably an extraction liquid, which is particularly water or hot water, is brought under high pressure into the brewing chamber of the device for producing a beverage. The extraction liquid interacts with the raw material of the beverage in such a way that an extract of a beverage or a beverage is generated. In particular the filter element is utilized as a strainer for the extract of a beverage.

According to the invention, the base element 2 has a wall region 2.1 and a bottom area 2.2. The wall region 2.1 basically ranges from the flange 17 to the bottom region 2.2. Several grooves 32 are placed in the wall region. In particular these grooves are keyways that are integrated in the wall region 2.1 and are facing the cavity 3 and range from the flange 17 to the bottom region 2.2 (i.e. they run perpendicular according to FIG. 19). According to the invention provision is made for the grooves 32 to be extended vertically across the wall region, i.e. they run straight from the flange 17 to the bottom region 2.2, in which it is not necessary that they are extended over the whole length. The grooves are formed according to the invention in such a way that the wall region is reinforced or stiffened due to the grooves 32. Moreover, the plurality of the grooves 32, which are distributed over the wall region 2.1, realize an adhesion between wall region 2.1 and the brewing chamber's wall of the device for producing a beverage after the extraction process. This makes it easier to eject the portion capsule from the brewing chamber automatically. The portion capsule's version represented in FIG. 19 comprises a circumferential border 16 that is placed at the wall region 2.1 ranging from the flange 17 to the bottom area 2.2, namely adjacent to the flange 17 facing towards the bottom area 2.2. The border 16 has an enlarged diameter (parallel to the membrane 4) compared to the wall region's ranging from the border 16 to the bottom area 2.2. It is provided that the border's contour 16 is designed in such a manner that the border's diameter tapers towards the flange 17.

It is provided according to the portion capsule's embodiment, which is represented in FIG. 19 and is in accordance with the invention, that the grooves 32 are placed in the border's region in the first part, partially range from the border 16 to the bottom area 2.2 across the wall region 2.1, in the second part and then finally end. All in all, the grooves cover, for example, around 50% of the extension of the wall region 2.1, which ranges from the flange 17 to the bottom area 2.2, wherein one-third of the grooves' extension is placed in the border's region and two-thirds of the grooves' extension is placed in the remaining wall region 2.1 that range from the border 16 to the bottom area 2.2.

Figure 21:
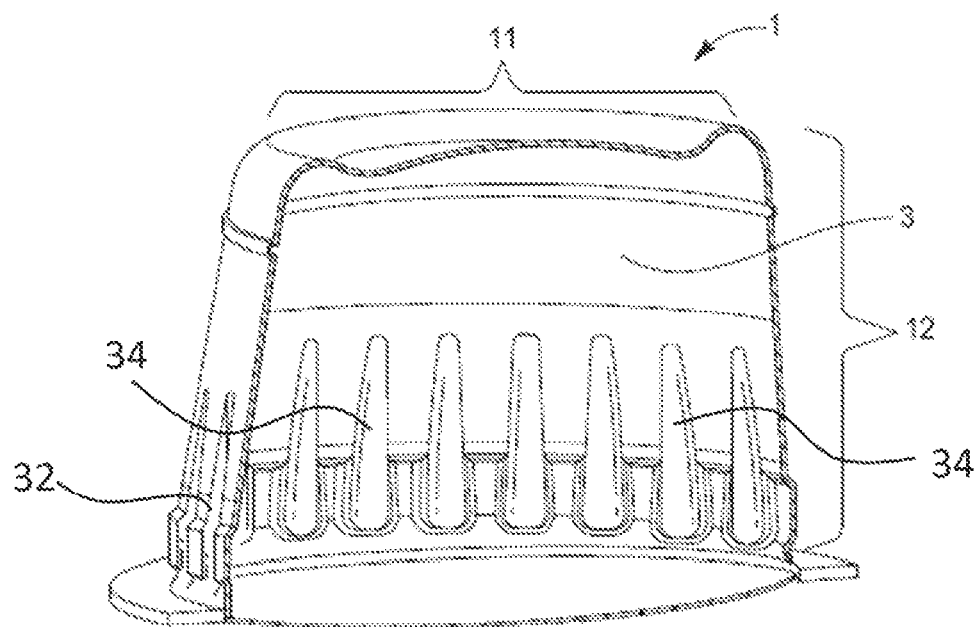
FIGS. 21 and 22 show two sectional views of the portion capsule according to an embodiment of the presented invention.
Figure 22:
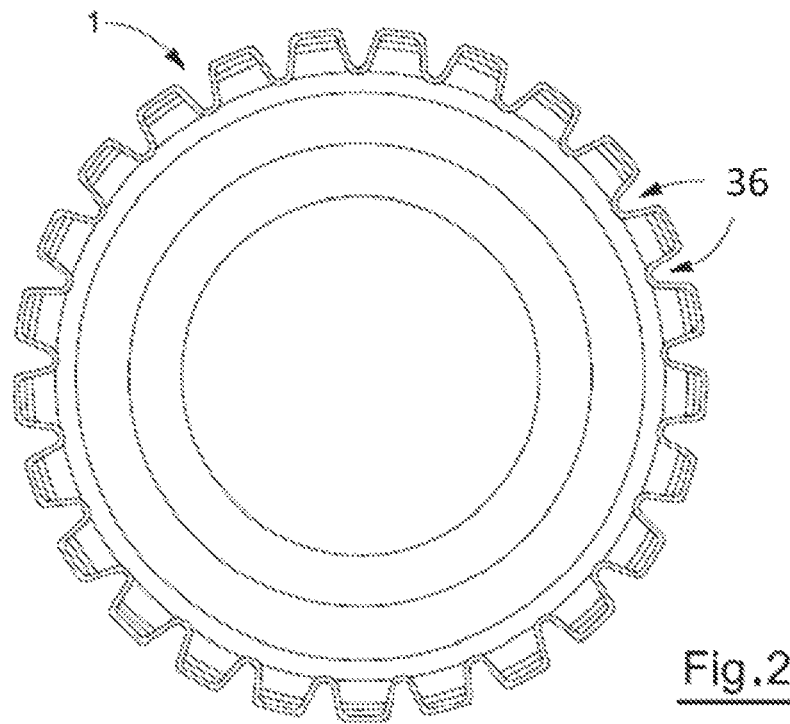

A portion capsule 1 according to the invention is shown as sectional view along the portion capsule's extension regarding its height in FIG. 21, i.e. the section's plane is perpendicular to the membrane's main plane. FIG. 22 also shows a portion capsule according to the invention in a sectional view portraying the sectional plane, which is parallel to the membrane's main plane. It is noticeable that the interior of the portion capsule's cavity is shown in FIG. 21. The portion capsule's material or the base element's material is so thin that the implementation of grooves 32 at the exterior shown in FIG. 19 leads to corresponding convexities 34 and impressions at the interior. FIG. 22 particularly illustrates the gearwheel shaped contour 36 resulting from insertion of grooves in the portion capsule's 1 wall region.

LIST OF REFERENCE NUMERALS 1 portion capsule
2 base element 2.1 wall region
2.2 bottom area
2.3 ring
2.4 edge region
2.4.1 sealing surface
2.4.2 means for friction locking and/or detection
3 cavity
4 membrane, cover foil
5,6 unequal sections
7 recess
8 raised area, bulge
10 electrically conductive coat
11 metallic ring
12 brewing chamber
13 detector, mean for detection
14 beam
16 border
17 flange
20 ferromagnetic material
21 reflective section
22 mat section
23 insertion shaft housing
24 mean for fit locking
25 inner wall
26 insertion shaft
28 water inlet
29 mandrel
30 holding arms
31 seal
32 grooves
34 convexities
36 gearwheel shaped contour

The invention claimed is:

1. A method of making a portion capsule for use with a beverage making machine to make a beverage, the beverage making machine incudes a pump, an optical detector, a mandrel, and a seal, the method comprising:
    forming a metal material into a base element that includes: i) a wall extending around a central longitudinal axis to define a cavity, and ii) a rim having a top side and an opposing bottom side;
    filling the cavity with a beverage material;
    closing the cavity by attaching a foil cover onto the top side of the rim, the foil cover being dimensioned and configured to be: i) pierced by the mandrel of the beverage making machine in a piercing region that is laterally offset from the central longitudinal axis, and ii) sealed by the seal of the beverage making machine in a sealing region that is located between the piercing region and an outer perimeter of the rim; and
    providing an optically detectable identifier onto the metal material so that the optically detectable identifier results on the opposing bottom side of the rim, the optically detectable identifier having sections that differ optically;
    wherein the optically detectable identifier is configured to be read by the optical detector of the beverage making machine, and the pump is activated to supply hot water after the optically detectable identifier is read by the optical detector and compatibility of the portion capsule is determined based upon information obtained using the optically detectable identifier.

2. The method according to claim 1, wherein the forming step includes deep drawing the metal material, and wherein the attaching step includes sealing and/or bonding.

3. The method according to claim 1, wherein the foil cover is made of the same material as the base element.

4. The method according to claim 1, wherein the foil cover is made of a different material than the base element.

5. The method according to claim 1, wherein the optically detectable identifier results on a side wall of the base element, and the optically detectable identifier includes at least two areas which differ in their reflection properties.

6. The method according to claim 1, wherein the method is free of a step of providing a filter.

7. The method according to claim 6, wherein the forming step includes forming a plurality of indentations in the metal material so that the plurality of indentations result on an outside surface of the wall.

8. The method according to claim 7, wherein the plurality of indentations have a curved top end and a curved bottom end, the curved top end being spaced below the opposing bottom side of the rim.

9. The method according to claim 8, wherein the plurality of indentations are vertically aligned relative to the central longitudinal axis.

10. The method according to claim 6, wherein the wall has an electrically conductive section.

11. The method according to claim 1, wherein the foil cover is provided to be bowed upwardly.

12. The method according to claim 11, wherein the method comprises providing a barrier layer and one or more steps of: printing the optically detectable identifier onto the metal material; providing metal stripes onto the metal material; or printing the optically detectable identifier onto the metal material with a food approved color.

13. The method according to claim 11, wherein the forming step includes defining a tapered geometry in the wall of the base element.

14. The method according to claim 1, wherein the forming step includes forming the metal material to define a bottom area that is generally opposed to the rim and that is at least partially rounded.

15. The method according to claim 14, wherein the forming step includes forming the metal material to include an upper section and a lower section, the upper section is located adjacent to the rim, and the lower section is located between the upper section and the bottom area,
    wherein the upper section comprises a circumferential border and the wall in the lower section is angled, with respect to the upper section, and is tapered towards the bottom area.

16. A method of making a portion capsule for use with a beverage making machine to make a beverage, the beverage making machine incudes a pump, an optical detector, a mandrel, and a seal, the method comprising:
    forming a metal material into a base element that includes: i) a wall extending around a central longitudinal axis to define a cavity, ii) a rim having a top side and an opposing bottom side, and iii) a bottom area that is generally opposed to the rim and that is at least partially rounded;
    filling the cavity with a beverage material;
    closing the cavity by attaching a foil cover onto the top side of the rim, the foil cover being dimensioned and configured to be: i) pierced by the mandrel of the beverage making machine in a piercing region that is laterally offset from the central longitudinal axis, and ii) sealed by the seal of the beverage making machine in a sealing region that is located between the piercing region and an outer perimeter of the rim; and
    providing an optically detectable identifier onto the metal material so that the optically detectable identifier results on the opposing bottom side of the rim, the optically detectable identifier having sections that differ optically;
wherein the forming step includes deep drawing the metal material, and the attaching step includes sealing and/or bonding the foil cover to the top side of the rim; and
wherein the optically detectable identifier is configured to be read by the optical detector of the beverage making machine, and the pump is activated to supply hot water after the optically detectable identifier is read by the optical detector.

17. The method according to claim 16, wherein the foil cover is provided to be bowed upwardly.

18. The method according to claim 17, wherein the method comprises providing a barrier layer and one or more steps of: printing the optically detectable identifier onto the metal material; providing metal stripes onto the metal material; or printing the optically detectable identifier onto the metal material with a food approved color.

19. The method according to claim 18, wherein the forming step includes forming a plurality of indentations in the metal material so that the plurality of indentations result on an outside surface of the wall, and the plurality of indentations have a curved top end and a curved bottom end, the curved top end being spaced below the opposing bottom side of the rim.

20. The method according to claim 19, wherein the plurality of indentations are vertically aligned relative to the central longitudinal axis.

\* \* \* \* \*